(12) United States Patent
Barker et al.

(10) Patent No.: US 6,730,281 B2
(45) Date of Patent: May 4, 2004

(54) METHODS OF MAKING TRANSITION METAL COMPOUNDS USEFUL AS CATHODE ACTIVE MATERIALS

(75) Inventors: Jeremy Barker, Oxfordshire (GB); M. Yazid Saidi, Henderson, NV (US); Jeffrey L. Swoyer, Henderson, NV (US); Ming Dong, Henderson, NV (US)

(73) Assignee: Valence Technology, Inc., Henderson, NV (US)

( * ) Notice: Subject to any disclaimer, the term of this patent is extended or adjusted under 35 U.S.C. 154(b) by 41 days.

(21) Appl. No.: 10/150,353

(22) Filed: May 17, 2002

(65) Prior Publication Data

US 2003/0215715 A1 Nov. 20, 2003

Related U.S. Application Data

(63) Continuation of application No. 10/001,376, filed on Oct. 19, 2001, which is a continuation of application No. 09/484,919, filed on Jan. 18, 2000, now Pat. No. 6,528,033.

(51) Int. Cl.[7] .............................. C01B 25/30; C01D 1/02
(52) U.S. Cl. ............... 423/306; 423/593.1; 423/594.15; 423/594.2; 423/659
(58) Field of Search ........................ 423/594.15, 593.1, 423/306, 659, 592.1, 594.2

(56) References Cited

U.S. PATENT DOCUMENTS

| | | |
|---|---|---|
| 2,508,878 A | 5/1950 | Yates et al. |
| 2,570,232 A | 10/1951 | Hansgirg |
| 3,736,184 A | 5/1973 | Dey et al. |
| 3,865,745 A | 2/1975 | Block et al. |
| 4,009,092 A | 2/1977 | Taylor |
| 4,049,891 A | 9/1977 | Hong et al. |
| 4,177,060 A | 12/1979 | Tylko |
| 4,260,668 A | 4/1981 | Lecerf et al. |
| 4,434,216 A | 2/1984 | Joshi et al. |
| 4,477,541 A | 10/1984 | Fraioli |
| 4,512,905 A | 4/1985 | Clearfield et al. |
| 4,668,595 A | 5/1987 | Yoshino et al. |
| 4,683,181 A | 7/1987 | Armand et al. |
| 4,690,877 A | 9/1987 | Gabano et al. |
| 4,707,422 A | 11/1987 | de Neufville et al. |
| 4,792,504 A | 12/1988 | Schwab et al. |
| 4,803,137 A | 2/1989 | Miyazaki et al. |
| 4,828,834 A | 5/1989 | Nagaura et al. |
| 4,830,939 A | 5/1989 | Lee et al. |
| 4,925,752 A | 5/1990 | Fauteux et al. |
| 4,935,317 A | 6/1990 | Fauteux et al. |
| 4,985,317 A | 1/1991 | Adachi et al. |
| 4,990,413 A | 2/1991 | Lee et al. |
| 5,011,501 A | 4/1991 | Shackle et al. |
| 5,037,712 A | 8/1991 | Shackle et al. |
| 5,219,677 A | 6/1993 | Labat et al. |
| 5,232,794 A | 8/1993 | Krumpelt et al. |
| 5,240,794 A | 8/1993 | Thackeray et al. |
| 5,262,253 A | 11/1993 | Golovin |
| 5,262,548 A | 11/1993 | Barone |
| 5,281,496 A | 1/1994 | Clarke |
| 5,296,436 A | 3/1994 | Bortinger |
| 5,300,373 A | 4/1994 | Shackle |
| 5,316,877 A | 5/1994 | Thackeray et al. |
| 5,326,653 A | 7/1994 | Chang |
| 5,384,291 A | 1/1995 | Weimer et al. |
| 5,399,447 A | 3/1995 | Chaloner-Gill et al. |
| 5,411,820 A | 5/1995 | Chaloner-Gill |
| 5,418,091 A | 5/1995 | Gozdz et al. |
| 5,435,054 A | 7/1995 | Tonder et al. |
| 5,456,000 A | 10/1995 | Gozdz et al. |
| 5,460,904 A | 10/1995 | Gozdz et al. |
| 5,463,179 A | 10/1995 | Chaloner-Gill et al. |
| 5,482,795 A | 1/1996 | Chaloner-Gill |
| 5,496,663 A | 3/1996 | Walk et al. |
| 5,508,130 A | 4/1996 | Golovin |
| 5,512,214 A | 4/1996 | Koksbang |
| 5,514,490 A | 5/1996 | Chen et al. |
| 5,540,741 A | 7/1996 | Gozdz et al. |
| 5,541,020 A | 7/1996 | Golovin et al. |
| 5,567,548 A | 10/1996 | Walk et al. |
| 5,607,297 A | 3/1997 | Henley et al. |

(List continued on next page.)

FOREIGN PATENT DOCUMENTS

| | | |
|---|---|---|
| EP | 1 049 182 A2 | 11/2000 |
| JP | 11025983 | 1/1999 |

OTHER PUBLICATIONS

*Lutsko, V., Ion exchange and sorption processes as methods of synthesis of double phosphates and intercalated compounds, (1990), Phosphorous, Sulfur Silicon Relat. Elem., 51–52 (1–4), pp. 97–100, (No month).

(List continued on next page.)

*Primary Examiner*—John S. Maples
(74) *Attorney, Agent, or Firm*—Cynthia S. Kovacevic; Roger A. Williams

(57) ABSTRACT

A method for carrying out solid state reactions under reducing conditions is provided. Solid state reactants include at least one inorganic metal compound and a source of reducing carbon. The reaction may be carried out in a reducing atmosphere in the presence of reducing carbon. Reducing carbon may be supplied by elemental carbon, by an organic material, or by mixtures. The organic material is one that can form decomposition products containing carbon in a form capable of acting as a reductant. The reaction proceeds without significant covalent incorporation of organic material into the reaction product. In a preferred embodiment, the solid state reactants also include an alkali metal compound. The products of the method find use in lithium ion batteries as cathode active materials. Preferred active materials include lithium-transition metal phosphates and lithium-transition metal oxides. In a preferred embodiment, the reaction product contains carbon particles intimately mixed among crystals of the active materials.

14 Claims, No Drawings

U.S. PATENT DOCUMENTS

| | | | |
|---|---|---|---|
| 5,620,810 | A | 4/1997 | Golovin et al. |
| 5,643,695 | A | 7/1997 | Barker et al. |
| 5,660,948 | A | 8/1997 | Barker |
| 5,683,835 | A | 11/1997 | Bruce |
| 5,700,298 | A | 12/1997 | Shi et al. |
| 5,712,059 | A | 1/1998 | Barker et al. |
| 5,738,957 | A | 4/1998 | Amine et al. |
| 5,803,947 | A | 9/1998 | Engell et al. |
| 5,830,602 | A | 11/1998 | Barker et al. |
| 5,851,504 | A | 12/1998 | Barker et al. |
| 5,869,207 | A | 2/1999 | Saidi et al. |
| 5,871,866 | A | 2/1999 | Barker et al. |
| 5,910,382 | A | 6/1999 | Goodenough et al. |
| 5,932,375 | A | 8/1999 | Tarcy et al. |
| 6,020,087 | A | 2/2000 | Gao |
| 6,085,015 | A | 7/2000 | Armand et al. |
| 6,103,419 | A | 8/2000 | Saidi et al. |
| 6,136,472 | A | 10/2000 | Barker et al. |
| 6,153,333 | A | 11/2000 | Barker |
| 6,306,215 | B1 | 10/2001 | Larkin |
| 6,528,033 | B1 * | 3/2003 | Barker et al. ............... 423/306 |

OTHER PUBLICATIONS

*Butt, G., et al., Lithium metal phosphate cathodes for Li Secondary batteries, (1998), J. Australas. Ceram. Soc., 34(1), pp. 60–65, (No month).

*Okada, S., et al., Cathodes properties of phospho–olivines for lithium secondary batteries, (2000), 14(2), pp. 133–137, (No month).

*International Search Report PCT/US 00/35302; PCT Search Authority, Aug. 2001.

*Gummow, et al., Lithium extraction from orthorhombic lithium manganese oxide and the phase transformation to spinel, Mater. Res. Bull. (1993), 28(12), 1249–56, (No month).

*Linden, "Handbook of Batteries, 2nd Edition," McGraw–Hill, Inc. pp 36.4–36.9. 1995, (No month).

Huang, et al., "Approaching Theoretical Capacity of LiFePO4 at Room Temperature at High Rates," Electrochemical and Solid State Letters, 4 (10) A170–A172 (2001), (No month).

Huang, et al., "Approaching Theoretical Capacity of LiFePO4 at Room Temperature," www.electrochem.org/meetings/pst/200/abstracts/symposia/b1.htm (Apr. 3, 2002), Abstract #202, 200th Meeting of the Electrochemical Society Sep. 2–7, 2001. San Francisco.

*International Search Report PCT/US 00/35438; PCT Search Authority, May 2001.

* cited by examiner

METHODS OF MAKING TRANSITION METAL COMPOUNDS USEFUL AS CATHODE ACTIVE MATERIALS

This application claims priority as a continuation of U.S. Ser. No. 10/001,376 filed Oct. 19, 2001, which is a continuation of Ser. No. 09/484,919 Jan. 18, 2000, now U.S. Pat. No. 6,528,033, filed Jan. 18, 2000.

FIELD OF THE INVENTION

This invention relates to methods for producing electrode active materials which can be used to formulate electrodes for use in electrochemical cells in batteries. More particularly, the present invention relates to methods that involve reduction of a transition metal to form the active material.

BACKGROUND OF THE INVENTION

Lithium batteries have become a useful and desirable energy source in recent years. Generally speaking lithium batteries are prepared from one or more lithium electrochemical cells containing electrochemically active (electroactive) materials. Such cells typically include a negative electrode, a positive electrode, and an electrolyte interposed between spaced apart positive and negative electrodes. By convention, the negative electrode is the electrode that acts as an anode (where oxidation occurs) on discharge, while the positive electrode is the one that acts as a cathode (where reduction occurs) on discharge.

Batteries with anodes of metallic lithium and containing metal chalcogenides cathode active material have received acceptance in industry and commerce.

So-called lithium ion batteries are well known. Lithium ion batteries have an insertion anode, such as a lithium metal chalcogenide, lithium metal oxide, coke or graphite. These types of electrodes are typically used with lithium-containing insertion cathodes to form an electroactive couple in a cell. The resulting cells are not charged in an initial condition. Before this type of cell can be used to deliver electrochemical energy, it must be charged. In the charging operation, lithium is transferred from the lithium-containing electrode cathode (the positive electrode) to the negative electrode. During discharge the lithium is transferred from the negative electrode back to the positive electrode. During a subsequent recharge, the lithium is transferred back to the negative electrode where it reinserts. Thus with each charge/discharge cycle, the lithium ions (Li+) are transported between the electrodes. Such rechargeable batteries having no free metallic species, are called rechargeable ion batteries or rocking chair batteries.

Known positive electrode active materials include $LiCoO_2$, $LiMn_2O_4$, and $LiNiO_2$. Lithium compounds containing cobalt are relatively expensive to synthesize due to the intermediates required, while successful synthesis of lithium-nickel compounds is relatively complex and difficult. Lithium-manganese compounds, such as $LiMn_2O_4$, are generally more economical to synthesize than the preceding material and result in a relatively economical positive electrode.

Unfortunately all of the foregoing materials have drawbacks as electroactive materials in electrochemical cells. Cells employing the foregoing materials in the cathode experience significant loss of charge capacity over repeated charge/discharge cycles, commonly referred to as cycle fading. Furthermore, the initial capacity available (amp hours/gram) from the materials is less than the theoretical capacity because significantly less than 1 atomic unit of lithium engages in the electrochemical reaction. This initial capacity value is significantly diminished during the first cycle of operation and diminishes even further on every successive cycle of operation. For $LiNiO_2$ only about 0.5 atomic units of lithium is reversibly cycled during cell operation.

Many attempts have been made to reduce capacity fading, for example, as described in U.S. Pat. No. 4,828,834 by Niagara et al. However, the presently known and commonly used, alkali transition metal oxide compounds suffer from relatively low capacity. Therefore, there remains the difficulty of obtaining a lithium-containing electrode material having acceptable capacity without the disadvantage of significant capacity loss when used in a cell.

Alternative active materials for lithium ion applications are constantly being sought. In addition, there remains a need for providing an economical and reproducible synthesis method for such materials that will provide good quality material in suitable yields.

SUMMARY OF THE INVENTION

A method for carrying out solid state reactions under reducing conditions is provided. Solid state reactants include at least one inorganic metal compound and a source of reducing carbon. The reaction may be carried out in a reducing atmosphere in the presence of reducing carbon. Reducing carbon may be supplied by elemental carbon, by an organic material, or by mixtures. The organic material is one that can form decomposition products containing carbon in a form capable of acting as a reductant. The reaction proceeds without significant covalent incorporation of organic material into the reaction product. In a preferred embodiment, the solid state reactants also include an alkali metal compound.

The products of the method find use in lithium ion batteries as cathode active materials. Preferred active materials include lithium-transition metal phosphates and lithium-transition metal oxides. In a preferred embodiment, the reaction product contains carbon particles intimately mixed among crystals of the active materials. Such products may be produced by heating a metal compound with a source of carbon.

In a preferred embodiment, reaction is carried out in a stoichiometric excess of carbon. The resulting reaction product contains a mixture of a metal compound with a carbonaceous material having a high atom percent of carbon. The organic material or carbonaceous material is not significantly covalently incorporated into the reaction product, but rather the carbonaceous material is intimately mixed with the reduced metal compound.

In another aspect, a reductive reaction of an alkali metal compound and a transition metal compound in the presence of reducing carbon is carried out in a reducing atmosphere. The reducing atmosphere may contain a reducing gas such as hydrogen, methane, ammonia, or carbon monoxide.

DETAILED DESCRIPTION OF EMBODIMENTS OF THE INVENTION

Reductive methods are provided for synthesizing transition metal compounds and other compounds. In one aspect, the reaction products find use as battery active materials or as precursors for the synthesis of battery active materials.

Active materials of the invention contain at least one alkali metal and at least one other metal capable of being oxidized to a higher oxidation state. Preferred other metals are accordingly selected from the group consisting of transition metals (defined as Groups 4–11 of the periodic table), as well as certain other non-transition metals such as tin, bismuth, and lead. The active materials may be synthesized in single step reactions or in multi-step reactions. In at least one of the steps of the synthesis reaction, reducing carbon is used as a starting material. During the reductive step at least one metal is reduced in oxidation state.

In a preferred embodiment, the invention provides a method for synthesizing an inorganic metal compound, preferably a transition metal compound, comprising the steps of:

providing starting materials comprising at least one particulate metal compound and at least one organic material;

combining the starting materials to form a mixture; and heating the mixture at a temperature and for a time sufficient to form a reaction product In a preferred embodiment, at least one metal of the starting material is reduced in oxidation state during heating to form the metal compound. In one aspect, the metal compound includes a transition metal; in another aspect, the metal compound includes a non-transition element such as tin.

The reductant in the synthetic steps involving reduction of a metal is supplied by a reducing carbon. In one aspect, the reducing carbon is provided by elemental carbon, preferably in particulate form such as graphites, amorphous carbon, carbon blacks and the like. In another aspect, reducing carbon may also be provided by an organic precursor material, or by a mixture of elemental carbon and organic precursor material. The organic precursor material will also be referred to in this application as an organic material. The organic material or organic precursor material is one that is capable of forming a decomposition product that contains carbon in a form capable of acting as a reductant.

In another aspect, reaction of a metal compound and a source of carbon is carried out without simultaneous reduction of a metal. In this aspect, the metal compounds are provided in an oxidation state equal to their oxidation state in the desired product. Whether or not reaction proceeds with carbothermal reduction, the carbon particles preferably provide nucleation sites for the crystals of the reaction product. The crystals or grains thus produced are preferably smaller than they would be in the absence of the carbon. The smaller grain size preferably leads to more intimate packing of the crystals forming a high quality active material. Preferably, carbon particles are also dispersed throughout the reaction product, leading to a product with good conductivity between grains. This is believed to contribute to the high quality of the active material made under carbothermal conditions.

The reductive reactions may be generally carried out in an atmosphere that is essentially non-oxidizing. Optionally the atmosphere may contain a reducing gas, preferably hydrogen.

In one embodiment, active materials of the invention are mixed metal phosphates, optionally containing halogen or hydroxyl. Such mixed metal phosphates contain at least one metal, preferably a transition metal, capable of undergoing oxidation to a higher oxidation state.

In another embodiment, the phosphate group in active materials such as described above may be partially or wholly substituted by other anions. Non-limiting examples of such anions include silicate, sulfate, germanate, antimonate, monofluoromonophosphate, and difluoromonophosphate, as well as sulfur analogs of the above. For example, sulfur analogs of phosphate include the ions $PO_3S^{3-}$, $PO_2S_2^{3-}$, $POS_3^{3-}$ and $PS_4^{3-}$.

Phosphate active materials or active materials where other anions may completely or partially replace phosphate may be represented by the general formula $$A_aM_b(XY_4)_cZ_d,$$

wherein (a) A is selected from the group consisting of Li, Na, K, and mixtures thereof, and $0 < a \leq 8$;

(b) M comprises one or more metals, comprising at least one metal which is capable of undergoing oxidation to a higher valence state, and $1 \leq b \leq 3$;

(c) $XY_4$ is selected from the group consisting of $X'O_{4-x}Y'_x$, $X'O_{4-y}Y'_{2y}$, $X''S_4$, and mixtures thereof, where $X'$ is selected from the group consisting of P, As, Sb, Si, Ge, V, S, and mixtures thereof; $X''$ is selected from the group consisting of P, As, Sb, Si, V, Ge and mixtures thereof; $Y'$ is selected from the group consisting of halogen S, N, mixtures thereof and; $0 \leq x \leq 3$; and $0 < y \leq 2$; and $0 < c \leq 3$;

(d) Z is OH, halogen, or mixtures thereof, and $0 \leq d \leq 6$; and wherein M, X, Y, Z, a, b, c, d, x and y are selected so as to maintain electroneutrality of the compound.

In a preferred embodiment, M comprises two or more transition metals from Groups 4 to 11 of the Periodic Table. In another preferred embodiment, M comprises M'M", where M' comprises at least one transition metal from Groups 4 to 11 of the Periodic Table; and M" at least one element from Groups 2, 3, 12, 13, or 14 of the Periodic Table. Preferred embodiments include those where c=1, those where c=2, and those where c=3. Preferred embodiments include those where a 1 and c=1, those where a=2 and c=1, and those where a 3 and c=3. Preferred embodiments also include those having a structure similar to the mineral olivine (herein "olivines"), and those having a structure similar to NASICON (NA Super Ionic Conductor) materials (herein "NASICONs").

In the formula above, A is selected from the group consisting of Li (lithium), Na (sodium), K (potassium), and mixtures thereof. In a preferred embodiment, A is Li, or a mixture of Li with Na, a mixture of Li with K, or a mixture of Li, Na and K. In another preferred embodiment, A is Na, or a mixture of Na with K. Preferably "a" is from about 0.1 to about 6, more preferably from about 0.2 to about 6. Where c=1, a is preferably from about 0.1 to about 3, preferably from about 0.2 to about 2. In a preferred embodiment, where c=1, a is less than about 1. In another preferred embodiment, where c=1, a is about 2. Where c=2, a is preferably from about 0.1 to about 6, preferably from about 1 to about 6. Where c=3, a is preferably from about 0.1 to about 6, preferably from about 2 to about 6, preferably from about 3 to about 6.

M comprises one or more metals, comprising at least one metal which is capable of undergoing oxidation to a higher valence state. In a preferred embodiment, removal of alkali metal from the electrode active material is accompanied by a change in oxidation state of at least one of the metals comprising M. The amount of the metal that is available for oxidation in the electrode active material determines the amount of alkali metal that may be removed. Such concepts are, in general application, well known in the art, e.g., as disclosed in U.S. Pat. No. 4,477,541, Fraioli, issued Oct. 16, 1984; and U.S. Pat. No. 6,136,472, Barker, et al., issued Oct. 24, 2000, both of which are incorporated by reference herein.

Referring to the general formula $A_aM_b(XY_4)_cZ_d$, the amount (a') of alkali metal that can be removed, as a function of the quantity (b') and valence ($V^M$) of oxidizable metal, is $$a'=b'(V^M),$$

where $V^M$ is the difference between the valence state of the metal in the active material and a valence state readily available for the metal. (The term oxidation state and valence state are used in the art interchangeably.) For example, for an active material comprising iron (Fe) in the +2 oxidation state, $V^M=1$, wherein iron may be oxidized to the +3 oxidation state (although iron may also be oxidized to a +4 oxidation state in some circumstances). If b=2 (two atomic units of Fe per atomic unit of material), the maximum amount (a') of alkali metal (oxidation state +1) that can be removed during cycling of the battery is 2 (two atomic units of alkali metal). If the active material comprises manganese (Mn) in the +2 oxidation state, $V^M=2$, wherein manganese may be oxidized to the +4 oxidation state (although Mn may also be oxidized to higher oxidation states in some circumstances). Thus, in this example, the maximum amount (a') of alkali metal that can be removed from a formula unit of active material during cycling of the battery is 4 atomic units, assuming that a 4.

M may comprise a single metal, or a combination of two or more metals. In embodiments where M is a combination of elements, the total valence of M in the active material must be such that the resulting active material is electrically neutral (i.e., the positive charges of all anionic species in the material balance the negative charges of all cationic species), as further discussed below. The net valence of M ($V^M$) having a mixture of elements (M1, M2 . . . Mt) may be represented by the formula $$V^M=V^{M1}b_1+V^{M2}b_2+\ldots V^{Mt}b_t,$$

where $b_1+b_2+\ldots b_t=1$, and $V^{M1}$ is the oxidation state of M1, $V^{M2}$ is the oxidation state of M2, etc. (The net valence of M and other components of the electrode active material is discussed further, below.)

M may be, in general, a metal or metalloid, selected from the group consisting of elements from Groups 2–14 of the Periodic Table. As referred to herein, "Group" refers to the Group numbers (i.e., columns) of the Periodic Table as defined in the current IUPAC Periodic Table. See, e.g., U.S. Pat. No. 6,136,472, Barker et al., issued Oct. 24, 2000, incorporated by reference herein. In a preferred embodiment, M comprises one or more transition metals from Groups 4 to 11. In another preferred embodiment, M comprises a mixture of metals, $M'_eM''_f$, where M' is at least one transition metal from Groups 4 to 11, M" is at least one element which is from Groups 2, 3, 12, 13, or 14; and e+f=b. In a preferred embodiment, 0.8 a 1.2 and 0.8 b 1.2.

Transition metals useful herein include those selected from the group consisting of Ti (Titanium), V (Vanadium), Cr (Chromium), Mn (Manganese), Fe (Iron), Co (Cobalt), Ni (Nickel), Cu (Copper), Zr (Zirconium), Nb (Niobium), Mo (Molybdenum), Ru (Ruthenium), Rh (Rhodium), Pd (Palladium), Ag (Silver), Cd (Cadmium), Hf (Hafnium), Ta (Tantalum), W (Tungsten), Re (Rhenium), Os (Osmium), Ir (Iridium), Pt (Platinum), Au (Gold), Hg (Mercury), and mixtures thereof. Preferred are the first row transition series, selected from the group consisting of Ti, V, Cr, Mn, Fe, Co, Ni, Cu, and mixtures thereof. Particularly preferred transition metals useful here include Fe, Co, Mn, Cu, V, Cr, and mixtures thereof. In a preferred embodiment, the transition metals comprise Co and Fe. In some embodiments, mixtures of transition metals are preferred. Although, a variety of oxidation states for such transition metals are available, in some embodiments it is preferred that the transition metals have a +2 oxidation state.

M may also comprise non-transition metals and metalloids. Among such elements are those selected from the group consisting of Group 2 elements, particularly Be (Beryllium), Mg (Magnesium), Ca (Calcium), Sr (Strontium), Ba (Barium); Group 3 elements, particularly Sc (Scandium), Y (Yttrium), and the lanthanides, particularly La (Lanthanum), Ce (Cerium), Pr (Praseodymium), Nd (Neodymium), Sm (Samarium); Group 12 elements, particularly Zn (zinc) and Cd (cadmium); Group 13 elements, particularly B (Boron), Al (Aluminum), Ga (Gallium), In (Indium), Tl (Thallium); Group 14 elements, particularly Si (Silicon), Ge (Germanium), Sn (Tin), and Pb (Lead); Group 15 elements, particularly As (Arsenic), Sb (Antimony), and Bi (Bismuth); Group 16 elements, particularly Te (Tellurium); and mixtures thereof. Preferred non-transition metals include the Group 2 elements, Group 12 elements, Group 13 elements, and Group 14 elements. In a preferred embodiment, the non-transition metals have an oxidation state of +2 or +3. In another embodiment, the non-transition metals comprise at least one element in a +2 oxidation state and at least one element in a +3 oxidation state. Particularly preferred non-transition metals include those selected from the group consisting of Mg, Ca, Zn, Sr, Pb, Cd, Sn, Ba, Be, Al, and mixtures thereof. Particularly preferred are non-transition metals selected from the group consisting of Mg, Ca, Zn, Ba, Al, and mixtures thereof.

As further discussed herein, "b" is selected so as to maintain electroneutrality of the electrode active material. In a preferred embodiment, where c=1, b is from about 1 to about 2, preferably about 1. In another preferred embodiment, where c=2, b is from about 2 to about 3, preferably about 2. In another preferred embodiment, d is zero, c is about 1, 0.8 a 1.2, and 0.8 b 1.2.

$XY_4$ is selected from the group consisting of $X'O_{4-x}Y'_x$, $X'O_{4-y}Y'_{2y}$, $X''S_4$, and mixtures thereof, where X' is P (phosphorus), As (arsenic), Sb (antimony), Si (silicon), Ge (germanium), S (sulfur), and mixtures thereof, X" is P, As, Sb, Si, Ge and mixtures thereof. In a preferred embodiment, X' and X" are, respectively, selected from the group consisting of P, Si, and mixtures thereof. In a particularly preferred embodiment, X' and X" are P. Y' is halogen, preferably F (fluorine). Preferred groups $XY_4$ include, without limitation, phosphate, silicate, sulfate, germanate, arsenate, antimonate, monofluoromonophosphate, difluoromonophosphate, and mixtures of the above, as well as the sulfur-containing analogs of the above.

In a preferred embodiment 0<x<3; and 0<y<4, such that a portion of the oxygen (O) in the $XY_4$ moiety is substituted with halogen. In another embodiment, x and y are 0. In particularly preferred embodiment $XY_4$ is $X'O_4$, where X' is preferably P or Si, more preferably P.

Z is OH, halogen, or mixtures thereof. In one embodiment, "d" is equal to zero. In another preferred embodiment, d is non-zero and Z is selected from the group consisting of OH (hydroxyl), F (fluorine), Cl (chlorine), Br (bromine) and mixtures thereof. In a preferred embodiment, Z is OH. In another preferred embodiment, Z is F, or mixtures of F with OH, Cl, or Br. Preferably "d" is from about 0.1 to about 6, more preferably from about 0.2 to about 6. Where c=1, d is preferably from about 0.1 to about 3, preferably from about 0.2 to about 2. In a preferred embodiment, where c=1, d is about 1. Where c=2, d is preferably from about 0.1 to about 6, preferably from about 1 to about 6. Where c=3, d is preferably from about 0.1 to about 6, preferably from about 2 to about 6, preferably from about 3 to about 6.

The composition of M, X, Y, and Z, and the values of a, b, c, d, x and y, are selected so as to maintain electroneutrality of the electrode active material. As referred to herein "electroneutrality" is the state of the electrode active material wherein the sum of the positively charged species (e.g., M and X) in the material is equal to the sum of the negatively charged species (e.g., Y and Z) in the material. Preferably, the $XY_4$ moieties are comprised to be, as a unit moiety, an anion having a charge of −2, −3, or −4, depending on the selection of X.

Another class of battery active materials that may be prepared by the methods of the invention includes alkali metal-transition metal oxides, represented by the formula

wherein a represents an alkali metal, preferably selected from the group consisting of lithium, sodium and potassium, and more preferably lithium; M is a transition metal, a combination of transition metals, or a mixture of transition metals and non-transition metals; and the subscripts a, b, and f are non-zero and chosen for electroneutrality of the formula. In a preferred embodiment, the transition metal M is selected from the group consisting of iron, nickel, cobalt, manganese, iron, titanium, zirconium, molybdenum, and vanadium.

Active materials of general formula $A_aM_b(XY_4)_cZ_d$ may be readily synthesized by reacting starting materials in a solid state reaction, with or without simultaneous reduction of the metal species involved. According to the desired values of a, b, c, and d in the product, starting materials are chosen that contain "a" moles of alkali metal A from all sources, "b" moles of metals M from all sources, "c" moles of phosphate (or other $XY_4$ species) from all sources, and "d" moles of halide or hydroxide Z, again taking into account all sources. As discussed below, a particular starting material may be the source of more than one of the components A, M, $XY_4$, or Z. Alternatively it is possible to run the reaction with an excess of one or more of the starting materials. In such a case, the stoichiometry of the product will be determined by the limiting reagent among the components A, M, $XY_4$, and Z. Because in such a case at least some of the starting materials will be present in the reaction product mixture, it is usually desirable to provide exact molar amounts of all the starting materials.

Similarly, active materials of general formula $A_aM_bO_c$ may be synthesized by providing starting materials that provide at least "a" moles of alkali metal A from all sources and at least "b" moles of metal (or metals) M from all sources.

Sources of alkali metal include any of a number of salts or ionic compounds of lithium, sodium, potassium, rubidium or cesium. Lithium, sodium, and potassium compounds are preferred. Preferably, the alkali metal source is provided in powder or particulate form. A wide range of such materials is well known in the field of inorganic chemistry. Non-limiting examples include the lithium, sodium, and/or potassium fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, acetates, oxalates, and the like. Hydrates of the above compounds may also be used, as well as mixtures. In particular, the mixtures may contain more than one alkali metal so that a mixed alkali metal active material will be produced in the reaction.

Sources of metals M include salts or compounds of any of the transition metals, alkaline earth metals, or lanthanide metals, as well as of non-transition metals such as aluminum, gallium, indium, thallium, tin, lead, and bismuth. The metal compounds include, without limitation, fluorides, chlorides, bromides, iodides, nitrates, nitrites, sulfates, hydrogen sulfates, sulfites, bisulfites, carbonates, bicarbonates, borates, phosphates, hydrogen ammonium phosphates, dihydrogen ammonium phosphates, silicates, antimonates, arsenates, germanates, oxides, hydroxides, acetates, oxalates, and the like. Hydrates may also be used, as well as mixtures of metals, as with the alkali metals, so that alkali metal mixed metal active materials are produced. The metal M in the starting material may have any oxidation state, depending the oxidation state required in the desired product and the oxidizing or reducing conditions contemplated, as discussed below. The metal sources are chosen so that at least one metal in the final reaction product is capable of being in an oxidation state higher than it is in the reaction product.

Sources of the desired starting material anions such as the phosphates, halides, and hydroxides are provided by a number of salts or compounds containing positively charged cations in addition to the source of phosphate (or other $XY_4$ species), halide, or hydroxide. Such cations include, without limitation, metal ions such as the alkali metals, alkaline metals, transition metals, or other non-transition metals, as well as complex cations such as ammonium or quaternary ammonium. The phosphate anion in such compounds may be phosphate, hydrogen ammonium phosphate, or dihydrogen ammonium phosphate. As with the alkali metal source and metal source discussed above, the phosphate, halide, or hydroxide starting materials are preferably provided in particulate or powder form. Hydrates of any of the above may be used, as can mixtures of the above.

A starting material may provide more than one of the components A, M, $XY_4$, and Z, as is evident in the list above. In various embodiments of the invention, starting materials are provided that combine, for example, the alkali metal and halide together, or the metal and the phosphate. Thus for example, lithium, sodium, or potassium fluoride may be reacted with a metal phosphate such as vanadium phosphate or chromium phosphate, or with a mixture of metal compounds such as a metal phosphate and a metal hydroxide. In one embodiment, a starting material is provided that contains alkali metal, metal, and phosphate. There is flexibility to select starting materials containing any of the components of alkali metal A, metal M, phosphate (or other $XY_4$ moiety), and halide/hydroxide Z, depending on availability. Combinations of starting materials providing each of the components may also be used.

In general, any anion may be combined with the alkali metal cation to provide the alkali metal source starting material, or with the metal M cation to provide the metal M starting material. Likewise, any cation may be combined with the halide or hydroxide anion to provide the source of Z component starting material, and any cation may be used as counterion to the phosphate or similar $XY_4$ component. It is preferred, however, to select starting materials with counterions that give rise to volatile by-products. Thus, it is desirable to choose ammonium salts, carbonates, oxides, hydroxides, and the like where possible. Starting materials with these counterions tend to form volatile by-products such as water, ammonia, and carbon dioxide, which can be readily removed from the reaction mixture.

As noted above, the active materials $A_a M_b (XY_4)_c Z_d$ of the invention can contain a mixture of alkali metals A, a mixture of metals B, a mixture of components Z, and a phosphate group representative of the $XY_4$ group in the formula. In another aspect of the invention, the phosphate group can be completely or partially substituted by a number of other $XY_4$ moieties, which will also be referred to as "phosphate replacements" or "modified phosphates". Thus, active materials are provided according to the invention wherein the $XY_4$ moiety is a phosphate group that is completely or partially replaced by such moieties as sulfate $(SO_4)^{2-}$, monofluoromonophosphate, $(PO_3F)^{2-}$, difluoromonophosphate $(PO_2F)^{2-}$, silicate $(SiO_4)^{4-}$, arsenate, antimonate, vanadates, and germanate. Analogues of the above oxygenate anions where some or all of the oxygen is replaced by sulfur are also useful in the active materials of the invention, with the exception that the sulfate group may not be completely substituted with sulfur. For example thiomonophosphates may also be used as a complete or partial replacement for phosphate in the active materials of the invention. Such thiomonophosphates include the anions $(PO_3S)^{3-}$, $(PO_2S_2)^{3-}$, $(POS_3)^{3-}$, and $(PS_4)^{3-}$. They are most conveniently available as the sodium, lithium, or potassium derivative.

To synthesize the active materials containing the modified phosphate moieties, it is usually possible to substitute all or part of the phosphate compounds discussed above with a source of the replacement anion. The replacement is considered on a stoichiometric basis and the starting materials providing the source of the replacement anions are provided along with the other starting materials as discussed above. Synthesis of the active materials containing the modified phosphate groups proceeds as discussed above, either without redox or under oxidizing or reducing conditions. As was the case with the phosphate compounds, the compound containing the modified or replacement phosphate group or groups may also be a source of other components of the active materials. For example, the alkali metal and/or the mixed metal M may be a part of the modified phosphate compound.

Non-limiting examples of sources of monofluoromonophosphates include $Na_2PO_3F$, $K_2PO_3F$, $(NH_4)_2PO_3F \cdot H_2O$, $LiNaPO_3F \cdot H_2O$, $LiKPO_3F$, $LiNH_4PO_3F$, $NaNH_4PO_3F$, $NaK_3(PO_3F)_2$ and $CaPO_3F \cdot 2H_2O$. Representative examples of sources of difluoromonophosphate compounds include, without limitation, $NH_4PO_2F_2$, $NaPO_2F_2$, $KPO_2F_2$, $Al(PO_2F_2)_3$, and $Fe(PO_2F_2)_3$.

When it is desired to partially or completely substitute phosphorous in the active materials for silicon, it is possible to use a wide variety of silicates and other silicon containing compounds. Thus, useful sources of silicon in the active materials of the invention include orthosilicates, pyrosilicates, cyclic silicate anions such as $(Si_3O_9)^{6-}$, $(Si_6O_{18})^{12-}$ and the like and pyrocenes represented by the formula $[(SiO_3)^{2-}]_n$, for example $LiAl(SiO_3)_2$. Silica or $SiO_2$ may also be used.

Representative arsenate compounds that may be used to prepare the active materials of the invention include $H_3AsO_4$ and salts of the anions $[H_2AsO_4]^-$ and $HAsO_4]^{2-}$. Sources of antimonate in the active materials can be provided by antimony-containing materials such as $Sb_2O_5$, $M'SbO_3$ where $M'$ is a metal having oxidation state +1, $M'''SbO_4$ where $M'''$ is a metal having an oxidation state of +3, and $M''Sb_2O_7$ where $M''$ is a metal having an oxidation state of +2. Additional sources of antimonate include compounds such as $Li_3SbO_4$, $NH_4H_2SbO_4$, and other alkali metal and/or ammonium mixed salts of the $[SbO_4]^{3-}$ anion.

Sources of sulfate compounds that can be used to partially or completely replace phosphorous in the active materials with sulfur include alkali metal and transition metal sulfates and bisulfates as well as mixed metal sulfates such as $(NH_4)_2Fe(SO_4)_2$, $NH_4Fe(SO_4)_2$ and the like. Finally, when it is desired to replace part or all of the phosphorous in the active materials with germanium, a germanium containing compound such as $GeO_2$ may be used.

To prepare the active materials containing the modified phosphate groups, it suffices to choose the stoichiometry of the starting materials based on the desired stoichiometry of the modified phosphate groups in the final product and react the starting materials together according to the procedures described above with respect to the phosphate materials. Naturally, partial or complete substitution of the phosphate group with any of the above modified or replacement phosphate groups will entail a recalculation of the stoichiometry of the required starting materials.

The sources of components A, M, and alternatively phosphate (or other $XY_4$ moiety) and Z along with any carbon or organic material used in the reaction may be reacted together in the solid state while heating for a time and temperature sufficient to make a reaction product. The starting materials are preferably provided in powder or particulate form. The powders are mixed together with any of a variety of procedures, such as by ball milling, blending in a mortar and pestle, and the like. Thereafter the mixture of powdered starting materials may be compressed into a tablet and/or held together with a binder material to form a closely cohering reaction mixture. The reaction mixture is heated in an oven, generally at a temperature of about 400° C. or greater until a reaction product forms. However, when Z in the active material is hydroxide, it is preferable to heat at a lower temperature so as to avoid volatilizing water instead of incorporating hydroxyl into the reaction product. Exemplary times and temperatures for the reaction are given in the Examples below.

When the starting materials contain hydroxyl for incorporation into the reaction product, the reaction temperature is preferably less than about 400° C., and more preferably about 250° C. or less. One way of achieving such temperatures is to carry out the reaction hydrothermally. In a hydrothermal reaction, the starting materials are mixed with a small amount of a liquid such as water, and placed in a pressurized reaction vessel. The reaction temperature is limited to that which can be achieved by heating the liquid water under pressure, and the particular reaction vessel used.

The reaction may be carried out without redox. When the reaction is done without redox, the oxidation state of the metal or mixed metals in the reaction product is the same as in the starting materials. In a preferred embodiment, reactions without redox are carried out in the presence of elemental carbon or an organic material. Preferably, such conditions give rise to formation of fine-grained reaction products with advantageous conductive properties, believed to be due at least in part to the presence of carbon particles intimately dispersed throughout the reaction product.

The reaction may also be carried out with reduction, wherein at least one metal is reduced in oxidation state during heating. The reduction may be carried out in situ by including in the reaction mixture a reductant that will participate in the reaction to reduce the metal M, but that will preferably produce by-products that will not interfere with the active material when used later in an electrode or an electrochemical cell.

The reductant, which provides reducing power for the reactions, may be provided in the form of a reducing carbon by including a source of elemental carbon along with the other particulate starting materials. In a preferred embodiment, the reducing power is provided by simultaneous oxidation of carbon to either carbon monoxide or carbon dioxide.

The starting material metal compound or compounds are mixed together with carbon, which is included in an amount sufficient to reduce the metal ion of one or more of the metal-containing starting materials without full reduction to an elemental metal state. Excess quantities of one or more starting materials (for example, about a 5 to 10% excess) may be used to enhance product quality. An excess of carbon, remaining after the reaction, functions as a conductive constituent in the ultimate electrode formulation. This is an advantage since such remaining carbon is very intimately mixed with the product active material. Accordingly, large quantities of excess carbon, on the order of 100% excess carbon or greater are useable in the process. The carbon present during compound formation is thought to be intimately dispersed throughout the precursor and product. The presence of carbon particles in the starting materials is thought to provide nucleation sites for the production of the product crystals. The reaction product is believed to be comprised of small grains or crystals nucleated onto carbon particles. The individual grains are agglomerated. This provides many advantages, including the enhanced conductivity of the product.

Alternatively or in addition, reducing power may be provided by an organic material. The organic material is characterized as containing carbon and at least one other element, preferably hydrogen. The organic material generally forms a decomposition product, referred to herein as a carbonaceous material, upon heating under the conditions of the reaction. Without being bound by theory, representative decomposition processes that can lead to the formation of the carbonaceous material include, without limitation, pyrolization, carbonization, coking, destructive distillation, and the like. These process names, as well as the term thermal decomposition, are used interchangeably in this application to refer to the process by which a decomposition product capable of acting as a reductant is formed upon heating of a reaction mixture containing an organic material.

A typical decomposition product contains carbonaceous material. During reaction, at least a portion of the carbonaceous material formed is believed to participate as reductant. That portion that participates as reductant may form a volatile by-product such as discussed below. Any volatile by-product formed tends to escape from the reaction mixture so that it is not incorporated into the reaction product.

Although the invention is understood not to be limited as to the mechanism of action of the organic precursor material, it believed that the carbonaceous material formed from decomposition of the organic material provides reducing power similar to that provided by elemental carbon discussed above. For example, the carbonaceous material may produce carbon monoxide or carbon dioxide, depending on the temperature of the reaction. Alternatively, if the reaction is carried out without reduction, it is believed that the organic material decomposes under the reaction conditions to form a carbonaceous material that is finely dispersed in the reaction product, leading to advantageous properties.

It may also be that some of the organic material providing reducing power is oxidized to a non-volatile component, such as for example, oxygen-containing carbon materials such as, without limitation, alcohols, ketones, aldehydes, esters, and carboxylic acids and anhydrides. Such non-volatile by-products, as well as any carbonaceous material that does not participate as reductant (for example, any present in stoichiometric excess or any that does not otherwise react) will tend to remain in the reaction mixture along with the other reaction products, but will not be significantly covalently incorporated.

The carbonaceous material prepared by heating the organic precursor material will generally be enriched in carbon relative to the organic material. The carbonaceous material preferably contains from about 50 up to about 100 atom percent carbon. In a preferred embodiment, the carbonaceous material is essentially elemental carbon, with an atom percent of close to 100% carbon.

While it is believed that the organic precursor material generally forms a carbonaceous decomposition product that acts as a reductant and/or nucleation site as discussed above, it may be possible that a portion of the organic material participates as reductant without first undergoing a decomposition. The invention is not limited by the exact mechanism or mechanisms of the underlying reduction processes.

Reactions with the organic precursor material are conveniently carried out by combining starting materials and heating. The starting materials include at least one metal compound or transition metal compound as noted above. For convenience, it is preferred to carry out the decomposition of the organic material and a reduction in one step. In this embodiment, the organic material decomposes in the presence of the transition metal compound to form a decomposition product capable of acting as a reductant, which reacts with the transition metal compound to form a reduced transition metal compound. In another embodiment, the organic material may be decomposed in a separate step to form a decomposition product. The decomposition product may then be combined with a transition metal compound to form a mixture. The mixture may then be heated for a time and at a temperature sufficient to form a reaction product.

The organic precursor material may be any organic material capable of undergoing pyrolysis or carbonization, or any other decomposition process that leads to a carbonaceous material rich in carbon. Such precursors include in general any organic material, i.e., compounds characterized by containing carbon and at least one other element. Although the organic material may be a perhalo compound containing essentially no carbon-hydrogen bonds, typically the organic materials contain carbon and hydrogen. Other elements, such as without limitation halogens, oxygen, nitrogen, phosphorus, and sulfur, may be present in the organic material, as long as they do not significantly interfere with the decomposition process or otherwise prevent the reductions from being carried out. One example of a preferred organic material is coke, which contains mostly carbon and hydrogen. Other precursors include, without limitation, organic hydrocarbons, alcohols, esters, ketones, aldehydes, carboxylic acids, sulfonates, and ethers. Preferred precursors include the above species containing aromatic rings, especially the aromatic hydrocarbons such as tars, pitches, and other petroleum products or fractions. As used here, hydrocarbon refers to an organic compound made up of carbon and hydrogen, and containing no significant amounts of other elements. Hydrocarbons may contain impurities having some heteroatoms. Such impurities might result, for example, from partial oxidation of a hydrocarbon or incomplete separation of a hydrocarbon from a reaction mixture or natural source such as petroleum.

Other organic precursor materials include sugars and other carbohydrates, including derivatives and polymers. Examples of polymers include, without limitation, starch, cellulose, and their ether or ester derivatives. Other derivatives include, without limitation, the partially reduced and partially oxidized carbohydrates discussed below. On heating, carbohydrates readily decompose to form carbon and water. The term carbohydrates as used here encompasses the D-, L-, and DL-forms, as well as mixtures, and includes material from natural or synthetic sources.

In one sense as used in the invention, carbohydrates are organic materials that can be written with molecular formula $(C)_m (H_2O)_n$, where m and n are integers. For simple hexose or pentose sugars, m and n are equal to each other. Non-limiting examples of hexoses of formula $C_6H_{12}O_6$ include allose, altose, glucose, mannose, gulose, inose, galactose, talose, sorbose, tagatose, and fructose. Pentoses of formula $C_5H_{10}O_5$ are represented by, without limitation, ribose, arabinose, and xylose. Tetroses include erythrose and threose, while glyceric aldehyde is a triose. Other carbohydrates include the two-ring sugars (di-saccharides) of general formula $C_{12}H_{22}O_{11}$. Examples include, without limitation, sucrose, maltose, lactose, trehalose, gentiobiose, cellobiose, and melibiose. Three-ring (trisaccharides such as raffinose) and higher oligomeric and polymer carbohydrates may also be used. Non-limiting examples include starch and cellulose. As noted above, the carbohydrates readily decompose to carbon and water when heated to a sufficiently high temperature. The water of decomposition tends to turn to steam under the reaction conditions and volatilize.

It will be appreciated that other materials will also tend to readily decompose to $H_2O$ and a material very rich in carbon. Such materials are also intended to be included in the term "carbohydrate" as used in the invention. Such materials include slightly reduced carbohydrates such as, without limitation, glycerol, sorbitol, mannitol, iditol, dulcitol, talitol, arabitol, xylitol, and adonitol, as well as "slightly oxidized" carbohydrates such as, without limitation, gluconic, mannonic, glucuronic, galacturonic, mannuronic, saccharic, manosaccharic, ido-saccharic, mucic, talo-mucic, and allo-mucic acids. The formula of the slightly oxidized and the slightly reduced carbohydrates is similar to that of the carbohydrates.

A preferred carbohydrate is sucrose. Under the reaction conditions, sucrose melts at about 150–180° C. The liquid melt tends to distribute itself among the starting materials. At temperatures above about 450° C., sucrose and other carbohydrates decompose to form carbon and water. The as-decomposed carbon powder is in the form of fresh amorphous fine particles with high surface area and high reactivity.

The organic precursor material may also be an organic polymer. Organic polymers include without limitation, polyolefins such as polyethylene and polypropylene, butadiene polymers, isoprene polymers, vinyl alcohol polymers, furfuryl alcohol polymers, styrene polymers including polystyrene, polystyrene-polybutadiene and the like, divinylbenzene polymers, naphthalene polymers, phenol condensation products including those obtained by reaction with aldehyde, polyacrylonitrile, polyvinyl acetate, as well as cellulose starch and esters and ethers thereof described above.

In some embodiments, the organic precursor material is a solid available in particulate form. Particulate materials may be combined with the other particulate starting materials and reacted by heating according to the methods described above.

In other embodiments, the organic precursor material may be a liquid. In such cases, the liquid precursor material is combined with the other particulate starting materials to form a mixture. The mixture is heated, whereupon the organic material forms a carbonaceous material in situ. The reaction proceeds with carbothermal reduction. The liquid precursor materials may also advantageously serve or function as a binder in the starting material mixture as noted above.

Reducing carbon is generally used in the reactions in stoichiometric excess. To calculate relative molar amounts of reducing carbon, it is convenient to use an "equivalent" weight of the reducing carbon, defined as the weight per gram-mole of carbon atom. For elemental carbons such as carbon black, graphite, and the like, the equivalent weight is about 12 g/equivalent. For other organic materials, the equivalent weight per gram-mole of carbon atoms is higher. For example, hydrocarbons have an equivalent weight of about 14 g/equivalent. Examples of hydrocarbons include aliphatic, alicyclic, and aromatic hydrocarbons, as well as polymers containing predominantly or entirely carbon and hydrogen in the polymer chain. Such polymers include polyolefins and aromatic polymers and copolymers, including without limitation polyethylenes, polypropylenes, polystyrenes, polybutadienes, and the like. Depending on the degree of unsaturation, the equivalent weight may be slightly above or below 14.

For organic materials having elements other than carbon and hydrogen, the equivalent weight for the purpose of calculating a stoichiometric quantity to be used in the reactions is higher than 14. For example, in carbohydrates it is about 30 g/equivalent. Examples of carbohydrates include sugars such as glucose, fructose, and sucrose, as well as polymers such as cellulose and starch.

In a preferred embodiment, reduction is carried out in a reducing atmosphere in the presence of a reductant as discussed above. The term "reducing atmosphere" as used here means a gas or mixture of gases that is capable of providing reducing power for a reaction that is carried out in the atmosphere. Reducing atmospheres generally contain one or more so-called reducing gases. Non-limiting examples of reducing gases include hydrogen, carbon monoxide, methane, and ammonia, as well as mixtures of those. Reducing atmospheres are also generally characterized as having little or no oxidizing gases such as air or oxygen. If any oxidizing gas is present in the reducing atmosphere, it is at a level low enough that it does not significantly interfere with reduction processes going on.

The stoichiometry of the reduction can be selected along with the relative stoichiometric amounts of the starting components A, M, $PO_4$ (or other $XY_4$ moiety), and Z. It is usually easier to provide the reducing agent in stoichiometric excess and remove the excess, if desired, after the reaction. In the case of the reducing gases and the use of reducing carbon such as elemental carbon, any excess reducing agent does not present a problem. In the former case, the gas is volatile and is easily separated from the reaction mixture, while in the latter, the excess carbon in the reaction product does not harm the properties of the active material, because carbon is generally added to the active material to form an electrode material for use in the electrochemical cells and batteries of the invention. Conveniently also, the by-products carbon monoxide or carbon dioxide (in the case of carbon) or water (in the case of hydrogen) are readily removed from the reaction mixture.

The invention also includes active materials made in two or more steps wherein at least one step is carried out under reducing conditions as discussed above. Typically, in a first step, a precursor material containing a reduced metal is synthesized by one of the reductive methods. Starting materials are provided that contain at least one metal and a source of reducing carbon. The starting materials are combined to form a mixture, and the mixture is heated at a temperature and for a time sufficient to cause formation of a reaction product. At least one metal of the starting materials is reduced during the heating step, and the reaction product comprises a reduced metal compound. In a subsequent step, an alkali metal may be incorporated by reacting the product of the first step with an alkali metal compound, with or without reduction. In one embodiment, the starting materials of the first step contain no lithium or other alkali metal, and no lithium or other alkali metal is incorporated into the reduced metal compound. In other embodiments, the starting materials of the first step may contain lithium or other alkali metals, and the lithium or other alkali metals may be incorporated into the precursor material. However, preferably the amount of lithium or other alkali metal incorporated into the precursor material in the first step will be less than that incorporated in the subsequent step by reacting an alkali metal compound with the precursor material.

In one preferred embodiment, a metal oxide such as, for example, a transition metal oxide, may be reduced in a first step; non-limiting examples include reduction of a +6 metal to a +4 metal in the reaction exemplified by the formula $MO_3 + [C] \rightarrow MO_2$.

Here and in the Examples, the symbol [C] is used to denote the source of reducing carbon, which can be provided by an elemental carbon, by an organic material that decomposes under the reaction conditions to form a decomposition product capable of acting as a reductant, or a combination of elemental carbon and organic material.

In the formula, M represents a +6 metal or mixture of metals having an average oxidation state of +6. M can generally be any metal capable of being reduced from +6 to +4. Non-limiting examples include V, Mo, Mn, W, Ir, Os, and Re. The following balanced equations illustrate an advantage of the reductive methods of the invention:

$$MO_3 + \tfrac{1}{2}[C]\ MoO_2 + \tfrac{1}{2}CO_2$$

Or, $$MO_3 + [C]\ MoO_2 + CO$$

The only by-products are volatile $CO_2$ or CO. Because of this, it is usually desirable to provide the reducing carbon in stoichiometric excess. Such excess will tend to drive the reaction to completion. Excess reducing carbon remaining after reaction will be intimately mixed in the product. This is normally advantageous for subsequent use of the materials as battery active materials.

Other metal oxides can be used in the reductive methods of the invention. For example, +5 metal oxides may be reduced according to the equation $$M_2O_5 + [C]\ M_2O_3$$

showing reduction from a +5 to a +3 oxidation state. Non-limiting examples of M include V and Mn. Note that here and in some of the examples below, the equations are written for clarity in unbalanced form, omitting the carbon monoxide or carbon dioxide by-products, as well as the precise stoichiometry of the reducing carbon. Such reductant stoichiometry and resulting by-products will vary, depending on the reaction conditions chosen.

To further illustrate, by way of non-limiting examples, a +4 metal oxide may be reduced to a +3 metal oxide according to $$2MO_2 + [C]\ M_2O_3$$

or to a +2 metal oxide according to the equation.

$$MO_2 + [C]\ MO$$

In another embodiment, the precursor compounds are prepared that have anions other than or in addition to the oxides described above. These preparations generally involve reacting a metal containing starting material not only with a source of reducing carbon, but also with at least a third material comprising a source of the other anions. Preferred anions include the $XY_4$ anions described above. Non-limiting examples of such anions include phosphate, silicate, sulfate, selenate and the like, such as described earlier. To illustrate, a transition metal phosphate may be produced by reducing a transition metal simultaneously with reaction with a material that serves as a source of phosphate. For example, transition metal phosphates may be made by reacting oxides of a transition metal with a source of phosphate as in the formula $$M_2O_5 + (NH_4)_2HPO_4 + [C] \rightarrow MPO_4$$

where M represents a metal or mixture of metals. In one embodiment, M comprises vanadium. Other non-limiting examples of a source of phosphate are phosphate salts, hydrogen phosphate salts, dihydrogen phosphate salts, and phosphoric acid ($H_3PO_4$). Preferably, the cations associated with the phosphate anion are those that form volatile by-products (such as ammonia or water) during the reaction. As noted above, the by-products are not given in the simplified unbalanced equation above.

The metal precursor compound may be reacted in subsequent steps with compounds containing the other groups of the active materials to form the compounds of the invention. The subsequent steps may or may not involve further reducing conditions. In a preferred embodiment, carbon mediated reduction is carried out in a first step. In a second step or in subsequent steps, the transition metal containing precursor compound is reacted with other starting materials to form the active materials. In a preferred embodiment, the transition metal containing precursor is reacted with an alkali metal compound, preferably a lithium compound, to prepare alkali metal containing transition metal compounds useful as battery active materials.

The subsequent step of reaction of the precursor material with an alkali metal compound may be carried out with or without simultaneous reduction of transition metals in the starting materials. A non-limiting example of reducing conditions during reaction is given by carbothermal reduction of a metal oxide by reaction with reducing carbon and a source of alkali metal. Such a reaction is illustrated, for example, in co-pending application Ser. No. 09/974,311, the disclosure of which is incorporated by reference. For example, lithium molybdenum compounds can be prepared with reduction according to the (unbalanced) equation $$Li_2CO_3 + MoO_2 + [C]\ Li\ MoO_2$$

or without reduction according to the equation $$Li_2CO_3 + MoO_2\ Li_4\ Mo_3\ O_8$$

In the first equation, a +4 metal (exemplified by molybdenum) is reduced to a +3 metal. In the second equation, the metal has the same oxidation state in the product as it had in the starting material.

Other reactions that incorporate an alkali metal into a transition metal compound with or without reduction are described in co-pending application Ser. No. 10/045,685 filed Nov. 7, 2001, Ser. No. 09/969,440 filed Oct. 2, 2001, Ser. No. 09/974,311 filed Oct. 9, 2001, and in Barker et al., PCT publication WO/01/53198, the disclosures of which are incorporated by reference. To illustrate, an alkali metal compound may be reacted with a phosphate material without reduction according to a formula:

$$1\tfrac{1}{2}\ Li_2\ CO_3 + M\ (PO_4)_2 + (NH_4)_3\ PO_4\ 3Li\ M\ PO_4$$

where M represents a +2 metal or mixture of metals. Non-limiting examples of M include Fe, Co, and Ni.

Alternatively, a reaction may be carried out with reduction according to:

$$\tfrac{1}{2}\ Li_2\ CO_3 + M\ PO_4 + [C]\ Li\ M\ PO_4$$

where M is a metal that is reduced from a +3 oxidation state to a +2 oxidation state. For clarity, the volatile by-products are omitted from the formula.

In another embodiment, an alkali metal and an anion such as fluoride are incorporated into a metal compound simultaneously, either without reduction according to a formula $$Li\ F + M\ PO_4\ Li\ M\ PO_4\ F$$

or with reduction according to a formula $$\tfrac{1}{2}\ Li_2\ CO_3 + Li\ F + M\ PO_4 + [C]\ Li_2\ M\ PO_4\ F$$

The above reaction schemes are illustrative only. Other reactions that incorporate alkali metal into a metal compound or transition metal compound prepared by carbothermal reduction will be apparent to the skilled artisan based on the description above and the further non-limiting examples given below, as well as the disclosures incorporated by reference. The invention provides reductive methods employing a reducing carbon, or a reducing carbon in the presence of a reducing atmosphere. The reducing carbon is provided by elemental carbon, by an organic material that forms a decomposition product capable of serving as a reductant under the reaction conditions, or a combination of elemental carbon and organic material.

Before reacting the mixture of starting materials, the starting materials are intermingled. Preferably, the starting materials are in particulate form, and the intermingling results in an essentially homogeneous powder mixture of the precursors. In one aspect, the precursor powders may be dry-mixed using, for example, a ball mill. Then the mixed powders are pressed into pellets. In another aspect, the precursor powders may be mixed with a binder. The binder is selected so as to not inhibit reaction between particles of the powders. Preferred binders decompose or evaporate at a temperature less than the reaction temperature. Non-limiting examples include mineral oils, glycerol, and polymers that decompose or carbonize to form a carbon residue before the reaction starts, or that evaporate before the reaction starts. Many of the binders used to hold the solid particles may also function as carbon precursor compounds, as described below. In still another aspect, intermingling is accomplished by forming a wet mixture using a volatile solvent and then the intermingled particles are pressed together in pellet form to provide good grain-to-grain contact.

The mixture of starting materials is heated for a time and at a temperature sufficient to form an inorganic transition metal compound reaction product. If the starting materials contain an alkali metal compound, the reaction product is an alkali metal transition metal compound. If the starting materials include a reducing agent, the reaction product is a transition metal compound having at least one transition metal in a lower oxidation state relative to its oxidation state in the starting materials.

Generally, the particulate starting materials are heated to a temperature below the melting point of the starting material inorganic transition metal compound. At least a portion of the starting material remains in the solid state during the reaction.

The temperature should preferably be about 400° C. or greater, and desirably 450° C. or greater, and preferably 500° C. or greater, and generally will proceed at a faster rate at higher temperatures. The various reactions involve production of CO or $CO_2$ as an effluent gas. The equilibrium at higher temperature favors CO formation. Some of the reactions are more desirably conducted at temperatures greater than 600° C.; most desirably greater than 650° C.; preferably 700° C. or greater; more preferably 750° C. or greater. Suitable ranges for many reactions are about 700 to 950° C., or about 700 to 800° C.

Generally, the higher temperature reactions produce CO effluent and the stoichiometry requires more carbon be used than the case where $CO_2$ effluent is produced at lower temperature. This is because the reducing effect of the C to $CO_2$ reaction is greater than the C to CO reaction. The C to $CO_2$ reaction involves an increase in carbon oxidation state of +4 (from 0 to 4) and the C to CO reaction involves an increase in carbon oxidation state of +2 (from ground state zero to 2). Here, higher temperature generally refers to a range of about 650° C. to about 1000° C. and lower temperature refers to up to about 650° C. Temperatures higher than 1200° C. are not thought to be needed.

In one aspect, the method of the invention utilizes the reducing capabilities of carbon in a unique and controlled manner to produce desired products having structure and alkali metal content suitable for use as electrode active materials. In one aspect the method of the invention makes it possible to produce products containing lithium, metal and oxygen in an economical and convenient process. The advantages are at least in part achieved by the reductant, carbon, having an oxide whose free energy of formation becomes more negative as temperature increases. Such oxide of carbon is more stable at high temperature than at low temperature. This feature is used to produce products having one or more metal ions in a reduced oxidation state relative to the precursor metal ion oxidation state. The method utilizes an effective combination of quantity of carbon, time and temperature to produce new products and to produce known products in a new way.

Referring back to the discussion of temperature, at about 700° C. both the carbon to carbon monoxide and the carbon to carbon dioxide reactions are occurring. At closer to 600° C. the C to $CO_2$ reaction is the dominant reaction. At closer to 800° C. the C to CO reaction is dominant. Since the reducing effect of the C to $CO_2$ reaction is greater, the result is that less carbon is needed per atomic unit of metal to be reduced. In the case of carbon to carbon monoxide, each atomic unit of carbon is oxidized from ground state zero to plus 2. Thus, for each atomic unit of metal ion (M) which is being reduced by one oxidation state, one half atomic unit of carbon is required. In the case of the carbon to carbon dioxide reaction, one quarter atomic unit of carbon is stoichiometrically required for each atomic unit of metal ion (M) which is reduced by one oxidation state, because carbon goes from ground state zero to a plus 4 oxidation state. These same relationships apply for each such metal ion being reduced and for each unit reduction in oxidation state desired.

The starting materials may be heated at ramp rates from a fraction of a degree up to about 10° C. per minute. Higher or lower ramp rates may be chosen depending on the available equipment, desired turnaround, and other factors. It is also possible to place the starting materials directly into a pre-heated oven. Once the desired reaction temperature is attained, the reactants (starting materials) are held at the reaction temperature for a time sufficient for reaction to occur. Typically the reaction is carried out for several hours at the final reaction temperature. The heating is preferably conducted under non-oxidizing or inert gas such as argon or vacuum, or in the presence of a reducing atmosphere.

Advantageously, a reducing atmosphere is not required, although it may be used if desired. After reaction, the products are preferably cooled from the elevated temperature to ambient (room) temperature (i.e., 10° C. to 40° C.). The rate of cooling may vary according to a number of factors including those discussed above for heating rates. For example, the cooling may be conducted at a rate similar to the earlier ramp rate. Such a cooling rate has been found to be adequate to achieve the desired structure of the final product. It is also possible to quench the products to achieve a higher cooling rate, for example on the order of about 100° C./minute.

Although the reactions may be carried out in oxygen or air, the heating is preferably conducted under an essentially non-oxidizing atmosphere. The atmosphere is essentially non-oxidizing so as not to interfere with the reduction reactions taking place. An essentially non-oxidizing atmosphere can be achieved through the use of vacuum, or through the use of inert gases such as argon, nitrogen, and the like. Although oxidizing gas (such as oxygen or air), may be present, it should not be at so great a concentration that it interferes with the carbothermal reduction or lowers the quality of the reaction product. It is believed that any oxidizing gas present will tend to react with the reducing carbon and lower the availability of the carbon for participation in the reaction. To some extent, such a contingency can be anticipated and accommodated by providing an appropriate excess of reducing carbon as a starting material. Nevertheless, it is generally preferred to carry out the carbothermal reduction in an atmosphere containing as little oxidizing gas as practical.

Advantageously, a reducing atmosphere is not required, although it may be used if desired. For example, the reaction may be carried out in the presence of reducing gases. Non-limiting examples of reducing gases include hydrogen, methane, ammonia, and carbon monoxide. Conveniently, reducing gases, preferably hydrogen, are provided in stoichiometric excess. This may be accomplished by carrying out the heating steps described above in a hydrogen atmosphere. The reducing atmosphere may be provided as pure reducing gas, or as mixtures of reducing gas with other gases. Non-limiting examples of reducing atmospheres include hydrogen, hydrogen-argon, hydrogen-nitrogen, carbon monoxide, carbon monoxide-hydrogen, carbon monoxide-argon, and the like. The reducing gas may but need not be provided in molar excess. The reducing gas may be used in partial pressures from about 0.01 atmospheres up to super-atmospheric, depending on such factors as the size of the sample, the volume of the heating chamber, and the excess of gas, if any, required for the reaction.

Carbothermal reduction according to the invention as described above is essentially a solid state reaction; as such the nature of the product formed in reaction depends on the particle size and the nature of particle to particle contact. Preferably, fine powders of starting materials are provided and the powdered or particulate starting materials are formed into a mixture by means of either pressure in a tableting process or in a mixture having a binder. Such mixtures are preferred in order to bring the particulate starting materials into close contact. If there is inhomogeneity in the starting materials or if the particles are not brought into contact well with one another it can lead to inhomogeneous products, lower yields, or lower quality products. The use of an atmosphere containing a reducing gas during the carbothermal reaction ensures a more uniform reaction, leading to more homogeneous products, higher yields, and higher quality products.

The present invention provides electrode active materials for use in a battery. As used herein, "battery" refers to a device comprising one or more electrochemical cells for the production of electricity. Each electrochemical cell comprises an anode, a cathode, and an electrolyte. Two or more electrochemical cells may be combined, or "stacked," so as to create a multi-cell battery having a voltage that is the sum of the voltages of the individual cells.

The electrode active materials of this invention may be used in the anode, the cathode, or both. As used herein, the terms "cathode" and "anode" refer to the electrodes at which reduction and oxidation occur, respectively, during battery discharge. During charging of the battery, the sites of oxidation and reduction are reversed. Preferably, the active materials of this invention are used in the cathode. Also, as used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.)

It has been found that the novel electrode materials, electrodes, and batteries of this invention afford benefits over such materials and devices among those known in the art. Such benefits include one or more of the following: increased capacity, enhanced cycling capability, enhanced reversibility, and reduced costs. Specific benefits and embodiments of the present invention are apparent from the detailed description set forth herein. It should be understood, however, that the detailed description and specific examples, while indicating embodiments among those preferred, are intended for purposes of illustration only and are not intended to limited the scope of the invention.

As discussed above, the present invention provides active materials (herein "electrode active materials") comprising lithium or other alkali metals, at least one transition metal, a phosphate or similar moiety, and a halogen or hydroxyl moiety. Such electrode active materials include those of the formula $A_aM_b(XY_4)_cZ_d$. (As used herein, the word "include," and its variants, is intended to be non-limiting, such that recitation of items in a list is not to the exclusion of other like items that may also be useful in the materials, compositions, devices, and methods of this invention.)

Electrodes

The present invention also provides electrodes comprising an electrode active material of the present invention. In a preferred embodiment, the electrodes of the present invention comprise an electrode active material of this invention, a binder; and an electrically conductive carbonaceous material.

In a preferred embodiment, the electrodes of this invention comprise:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity.

(Unless stated otherwise, all percentages herein are by weight.) Cathodes of this invention preferably comprise from about 50% to about 90% of active material, about 5% to about 30% of the electrically conductive material, and the balance comprising binder. Anodes of this invention preferably comprise from about 50% to about 95% by weight of the electrically conductive material (e.g., a preferred graphite), with the balance comprising binder.

Electrically conductive materials among those useful herein include carbon black, graphite, powdered nickel, metal particles, conductive polymers (e.g., characterized by a conjugated network of double bonds like polypyrrole and polyacetylene), and mixtures thereof. Binders useful herein preferably comprise a polymeric material and extractable plasticizer suitable for forming a bound porous composite. Preferred binders include halogenated hydrocarbon polymers (such as poly(vinylidene chloride) and poly((dichloro-1,4-phenylene)ethylene), fluorinated urethanes, fluorinated epoxides, fluorinated acrylics, copolymers of halogenated hydrocarbon polymers, epoxides, ethylene propylene diamine termonomer (EPDM), ethylene propylene diamine termonomer (EPDM), polyvinylidene difluoride (PVDF), hexafluoropropylene (HFP), ethylene acrylic acid copolymer (EAA), ethylene vinyl acetate copolymer (EVA), EAA/EVA copolymers, PVDF/HFP copolymers, and mixtures thereof.

In a preferred process for making an electrode, the electrode active material is mixed into a slurry with a polymeric binder compound, a solvent, a plasticizer, and optionally the electroconductive material. The active material slurry is appropriately agitated, and then thinly applied to a substrate via a doctor blade. The substrate can be a removable substrate or a functional substrate, such as a current collector (for example, a metallic grid or mesh layer) attached to one side of the electrode film. In one embodiment, heat or radiation is applied to evaporate the solvent from the electrode film, leaving a solid residue. The electrode film is further consolidated, where heat and pressure are applied to the film to sinter and calendar it. In another embodiment, the film may be air-dried at moderate temperature to yield self-supporting films of copolymer composition. If the substrate is of a removable type it is removed from the electrode film, and further laminated to a current collector. With either type of substrate it may be necessary to extract the remaining plasticizer prior to incorporation into the battery cell.

Batteries

The batteries of the present invention comprise:

(a) a first electrode comprising an active material of the present invention;

(b) a second electrode which is a counter-electrode to said first electrode; and (c) an electrolyte between said electrodes.

The electrode active material of this invention may comprise the anode, the cathode, or both. Preferably, the electrode active material comprises the cathode.

The active material of the second, counter-electrode is any material compatible with the electrode active material of this invention. In embodiments where the electrode active material comprises the cathode, the anode may comprise any of a variety of compatible anodic materials well known in the art, including lithium, lithium alloys, such as alloys of lithium with aluminum, mercury, manganese, iron, zinc, and intercalation based anodes such as those employing carbon, tungsten oxides, and mixtures thereof. In a preferred embodiment, the anode comprises:

(a) from about 0% to about 95%, preferably from about 25% to about 95%, more preferably from about 50% to about 90%, of an insertion material;

(b) from about 2% to about 95% electrically conductive material (e.g., carbon black); and (c) from about 3% to about 20% binder chosen to hold all particulate materials in contact with one another without degrading ionic conductivity.

In a particularly preferred embodiment, the anode comprises from about 50% to about 90% of an insertion material selected from the group active material from the group consisting of metal oxides (particularly transition metal oxides), metal chalcogenides, and mixtures thereof. In another preferred embodiment, the anode does not contain an insertion active, but the electrically conductive material comprises an insertion matrix comprising carbon, graphite, cokes, mesocarbons and mixtures thereof. One preferred anode intercalation material is carbon, such as coke or graphite, which is capable of forming the compound $Li_xC$. Insertion anodes among those useful herein are described in U.S. Pat. No. 5,700,298, Shi et al., issued Dec. 23, 1997; U.S. Pat. No. 5,712,059, Barker et al., issued Jan. 27, 1998; U.S. Pat. No. 5,830,602, Barker et al., issued Nov. 3, 1998; and U.S. Pat. No. 6,103,419, Saidi et al., issued Aug. 15, 2000; all of which are incorporated by reference herein.

In embodiments where the electrode active material comprises the anode, the cathode preferably comprises:

(a) from about 25% to about 95%, more preferably from about 50% to about 90%, active material;

(b) from about 2% to about 95% electrically conductive material (e.g., carbon black); and (c) from about 3% to about 20% binder chosen to hold all particulate materials in contact with one another without degrading ionic conductivity.

Active materials useful in such cathodes include electrode active materials of this invention, as well as metal oxides (particularly transition metal oxides), metal chalcogenides, and mixtures thereof. Other active materials include lithiated transition metal oxides such as $LiCoO_2$, $LiNiO_2$, and mixed transition metal oxides such as $LiCo_{1-m}Ni_mO_2$, where $0<m<1$. Another preferred active material includes lithiated spinel active materials exemplified by compositions having a structure of $LiMn_2O_4$, as well as surface treated spinels such as disclosed in U.S. Pat. No. 6,183,718, Barker et al., issued Feb. 6, 2001, incorporated by reference herein. Blends of two or more of any of the above active materials may also be used. The cathode may alternatively further comprise a basic compound to protect against electrode degradation as described in U.S. Pat. No. 5,869,207, issued Feb. 9, 1999, incorporated by reference herein.

The batteries of this invention also comprise a suitable electrolyte that provides for transfer of ions between the cathode and anode. The electrolyte is preferably a material that exhibits high ionic conductivity, as well as having insular properties to prevent self-discharging during storage. The electrolyte can be either a liquid or a solid. Solid electrolytes preferably comprise a polymeric matrix which contains an ionic conductive medium. A liquid electrolyte preferably comprises a solvent and an alkali metal salt that form an ionically conducting liquid.

One preferred embodiment is a solid polymeric electrolyte, comprising a solid polymeric matrix of an electrolyte compatible material formed by polymerizing an organic or inorganic monomer (or partial polymer thereof) and which, when used in combination with the other components of the electrolyte, results in a solid state electrolyte. Suitable solid polymeric matrices include those well known in the art and include solid matrices formed from organic polymers, inorganic polymers or a solid matrix forming monomer and from partial polymers of a solid matrix forming monomer.

The polymeric electrolyte matrix comprises a salt, typically inorganic, which is homogeneously dispersed via a solvent vehicle throughout the matrix. The solvent is preferably a low molecular weight organic solvent added to the electrolyte, which may serve the purpose of solvating the inorganic ion salt. The solvent is preferably any compatible, relatively non-volatile, aprotic, relatively polar solvent, including dimethyl carbonate (DMC), diethyl carbonate (DEC), dipropylcarbonate (DPC), ethyl methyl carbonate (EMC), butylene carbonate, gamma-butyrolactone, triglyme, tetraglyme, lactones, esters, dimethylsulfoxide, dioxolane, sulfolane, and mixtures thereof. Preferred solvents include EC/DMC, EC/DEC, EC/DPC and EC/EMC. Preferably, the inorganic ion salt is a lithium or sodium salt, such as for example, $LiAsF_6$, $LiPF_6$, $LiClO_4$, $LiB(C_6H_5)_4$, $LiAlCl_4$, LiBr, and mixtures thereof, with the less toxic salts being preferable. The salt content is preferably from about 5% to about 65%, preferably from about 8% to about 35%. A preferred embodiment is a mixture of $EC:DMC:LiPF_6$ in a weight ratio of about 60:30:10. Electrolyte compositions among those useful herein are described in U.S. Pat. No. 5,418,091, Gozdz et al., issued May 23, 1995; U.S. Pat. No. 5,508,130, Golovin, issued Apr. 16, 1996; U.S. Pat. No. 5,541,020, Golovin et al., issued Jul. 30, 1996; U.S. Pat. No. 5,620,810, Golovin et al., issued Apr. 15, 1997; U.S. Pat. No. 5,643,695, Barker et al., issued Jul. 1, 1997; U.S. Pat. No. 5,712,059, Barker et al., issued Jan. 27, 1997; U.S. Pat. No. 5,851,504, Barker et al., issued Dec. 22, 1998; U.S. Pat. No. 6,020,087, Gao, issued Feb. 1, 2001; and U.S. Pat. No. 6,103,419, Saidi et al., issued Aug. 15, 2000; all of which are incorporated by reference herein.

Additionally, the electrolyte comprises a separator, or is surrounded by a separator membrane. The separator allows the migration of ions through the membrane while still providing a physical separation of the electric charge between the electrodes, to prevent short-circuiting. Preferably, the separator also inhibits elevated temperatures within the battery that can occur due to uncontrolled reactions, preferably by degrading upon high temperatures to provide infinite resistance to prevent further uncontrolled reactions. In a preferred embodiment, the polymeric matrix of the electrolyte can contain an additional polymer (a separator) or the original polymeric matrix itself may function as a separator, providing the physical isolation needed between the anode and cathode.

A preferred electrolyte separator film comprises approximately two parts polymer for every one part of a preferred fumed silica. The conductive solvent comprises any number of suitable solvents and salts. Desirable solvents and salts are described in U.S. Pat. No. 5,643,695, Barker et al., issued Jul. 1, 1997; and U.S. Pat. No. 5,418,091, Gozdz et al., issued May 23, 1995; both of which are incorporated by reference herein. One example is a mixture of $EC:DMC:LiPF_6$ in a weight ratio of about 60:30:10.

A separator membrane element is generally polymeric and prepared from a composition comprising a copolymer. A preferred composition is the 75 to 92% vinylidene fluoride with 8 to 25% hexafluoropropylene copolymer (available commercially from Atochem North America as Kynar FLEX) and an organic solvent plasticizer. Such a copolymer composition is also preferred for the preparation of the electrode membrane elements, since subsequent laminate interface compatibility is ensured. The plasticizing solvent may be one of the various organic compounds commonly used as solvents for electrolyte salts, e.g., propylene carbonate or ethylene carbonate, as well as mixtures of these compounds. Higher-boiling plasticizer compounds such as dibutyl phthalate, dimethyl phthalate, diethyl phthalate, and tris butoxyethyl phosphate are preferred. Inorganic filler adjuncts, such as fumed alumina or silanized fumed silica, may be used to enhance the physical strength and melt viscosity of a separator membrane and, in some compositions, to increase the subsequent level of electrolyte solution absorption.

A preferred battery comprises a laminated cell structure, comprising an anode layer, a cathode layer, and electrolyte/separator between the anode and cathode layers. The anode and cathode layers comprise a current collector. A preferred current collector is a copper collector foil, preferably in the form of an open mesh grid. The current collector is connected to an external current collector tab. Such tabs and collectors are disclosed in, for example, U.S. Pat. No. 4,925,752, Fauteux et al, issued May 15, 1990; U.S. Pat. No. 5,011,501, Shackle et al., issued Apr. 30, 1991; and U.S. Pat. No. 5,326,653, Chang, issued Jul. 5, 1994; all of which are incorporated by reference herein. In a battery embodiment comprising multiple electrochemical cells, the anode tabs are preferably welded together and connected to a nickel lead. The cathode tabs are similarly welded and connected to a welded lead, whereby each lead forms the polarized access points for the external load.

Lamination of assembled cell structures is accomplished by conventional means by pressing between metal plates at a temperature of about 120–160° C. Subsequent to lamination, the battery cell material may be stored either with the retained plasticizer or as a dry sheet after extraction of the plasticizer with a selective low-boiling point solvent. The plasticizer extraction solvent is not critical, and methanol or ether are often used.

In a preferred embodiment, a electrode membrane comprising the electrode active material (e.g., an insertion material such as carbon or graphite or a insertion compound) dispersed in a polymeric binder matrix. The electrolyte/separator film membrane is preferably a plasticized copolymer, comprising a polymeric separator and a suitable electrolyte for ion transport. The electrolyte/separator is positioned upon the electrode element and is covered with a positive electrode membrane comprising a composition of a finely divided lithium insertion compound in a polymeric binder matrix. An aluminum collector foil or grid completes the assembly. A protective bagging material covers the cell and prevents infiltration of air and moisture.

In another embodiment, a multi-cell battery configuration may be prepared with copper current collector, a negative electrode, an electrolyte/separator, a positive electrode, and an aluminum current collector. Tabs of the current collector elements form respective terminals for the battery structure.

In a preferred embodiment of a lithium-ion battery, a current collector layer of aluminum foil or grid is overlaid with a positive electrode film, or membrane, separately prepared as a coated layer of a dispersion of insertion electrode composition. This is preferably an insertion compound such as the active material of the present invention in powder form in a copolymer matrix solution, which is dried to form the positive electrode. An electrolyte/separator membrane is formed as a dried coating of a composition comprising a solution containing VdF:HFP copolymer and a plasticizer solvent is then overlaid on the positive electrode film. A negative electrode membrane formed as a dried coating of a powdered carbon or other negative electrode material dispersion in a VdF:HFP copolymer matrix solution is similarly overlaid on the separator membrane layer. A copper current collector foil or grid is laid upon the negative electrode layer to complete the cell assembly. Therefore, the VdF:HFP copolymer composition is used as a binder in all of the major cell components, positive electrode film, negative electrode film, and electrolyte/separator membrane. The assembled components are then heated under pressure to achieve heat-fusion bonding between the plasticized copolymer matrix electrode and electrolyte components, and to the collector grids, to thereby form an effective laminate of cell elements. This produces an essentially unitary and flexible battery cell structure.

Cells comprising electrodes, electrolytes and other materials among those useful herein are described in the following documents, all of which are incorporated by reference herein: U.S. Pat. No. 4,668,595, Yoshino et al., issued May 26, 1987; U.S. Pat. No. 4,792,504, Schwab et al., issued Dec. 20, 1988; U.S. Pat. No. 4,830,939, Lee et al., issued May 16, 1989; U.S. Pat. No. 4,935,317, Fauteaux et al., issued Jun. 19, 1980; U.S. Pat. No. 4,990,413, Lee et al., issued Feb. 5, 1991; U.S. Pat. No. 5,037,712, Shackle et al., issued Aug. 6, 1991; U.S. Pat. No. 5,262,253, Golovin, issued Nov. 16, 1993; U.S. Pat. No. 5,300,373, Shackle, issued Apr. 5, 1994; U.S. Pat. No. 5,399,447, Chaloner-Gill, et al., issued Mar. 21, 1995; U.S. Pat. No. 5,411,820, Chaloner-Gill, issued May 2, 1995; U.S. Pat. No. 5,435,054, Tonder et al., issued Jul. 25, 1995; U.S. Pat. No. 5,463,179, Chaloner-Gill et al., issued Oct. 31, 1995; U.S. Pat. No. 5,482,795, Chaloner-Gill., issued Jan. 9, 1996; U.S. Pat. No. 5,660,948, Barker, issued Sep. 16, 1995; and U.S. Pat. No. 6,306,215, Larkin, issued Oct. 23, 2001. A preferred electrolyte matrix comprises organic polymers, including VdF:HFP. Examples of casting, lamination and formation of cells using VdF:HFP are as described in U.S. Pat. Nos. 5,418,091, Gozdz et al., issued May 23, 1995; U.S. Pat. No. 5,460,904, Gozdz et al., issued Oct. 24, 1995; U.S. Pat. No. 5,456,000, Gozdz et al., issued Oct. 10, 1995; and U.S. Pat. No. 5,540,741, Gozdz et al., issued Jul. 30, 1996; all of which are incorporated by reference herein.

The electrochemical cell architecture is typically governed by the electrolyte phase. A liquid electrolyte battery generally has a cylindrical shape, with a thick protective cover to prevent leakage of the internal liquid. Liquid electrolyte batteries tend to be bulkier relative to solid electrolyte batteries due to the liquid phase and extensive sealed cover. A solid electrolyte battery, is capable of miniaturization, and can be shaped into a thin film. This capability allows for a much greater flexibility when shaping the battery and configuring the receiving apparatus. The solid state polymer electrolyte cells can form flat sheets or prismatic (rectangular) packages, which can be modified to fit into the existing void spaces remaining in electronic devices during the design phase.

Aspects of the invention have been described above with respect to preferred embodiments. Further non-limiting description of the invention is provided in the examples that follow. Generally, reducing carbon is represented by the symbol [C] in the reaction schemes of the Examples. In each Example, the particular reducing carbon used is given in the step by step description.

EXAMPLES

Example 1

Carbothermal Reduction in Hydrogen of $MoO_3$ Using $Li_2CO_3$ as Lithium Source to Produce $LiMoO_2$ The reaction assumes C→CO reaction (i.e. >650° C.)
The overall reaction scheme can be written as:

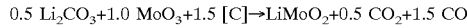

0.5 $Li_2CO_3$+1.0 $MoO_3$+1.5 [C]→$LiMoO_2$+0.5 $CO_2$+1.5 CO where [C] represents either elemental carbon or an equivalent amount of organic precursor material.

0.5 g-mol $Li_2CO_3$ is equivalent to 36.95 g 1.0 g-mol $MoO_3$ is equivalent to 143.94 g 1.5 g-mol [C] is equivalent to 18.00 g of elemental carbon An excess of carbon—typically 0–100% mass excess may be used.

Method (a) Pre-mix powders in molar proportions as shown (b) Pelletize powder mixture (c) Heat pellet at rate of 1–5° C./minute to 650–950° C. in a hydrogen atmosphere (d) Dwell at desired temperature for 2–8 hours (e) Cool to room temperature at rate 1–5° C./minute (f) Remove from furnace when temperature of furnace <25° C.

(g) Transfer to inert atmosphere (e.g. Ar glove box). These materials are generally air sensitive (h) Powderize (i) Optionally, re-pelletize and repeat steps (c) through (h) above

Example 2

Direct Carbothermal Reduction of $MoO_3$ Using $LiOH.H_2O$ as Lithium Source

The reaction assumes C→CO reaction (i.e. >650° C.)
The reaction scheme is:

1.0 $LiOH.H_2O$+1.0 $MoO_3$+1.5[C]→$LiMoO_2$+1.5 $H_2O$+1.5 CO 1.0 g-mol $LiOH.H_2O$ is equivalent to 41.96 g 1.0 g-mol $MoO_3$ is equivalent to 143.94 g 1.5 g-mol [C] is provided by about 21 g of polystyrene-polybutadiene An excess of carbon, typically 0–100% mass excess, may be used.

Method (a) Pre-mix powders in molar proportions as shown (b) Pelletize powder mixture (c) Heat pellet at rate of 1–5° C./minute to 650–950° C. in inert atmosphere ($N_2$, Ar or vacuum)

(d) Dwell at desired temperature for 2–8 hours (e) Cool to room temperature at rate 1–5° C./minute (f) Remove from furnace when temperature of furnace <25° C.

(g) Transfer to inert atmosphere (e.g. Ar glove box). These materials are generally air sensitive.

(h) Powderize (i) Optionally, re-pelletize and repeat steps (c) through (h) above.

Example 3

Direct Carbothermal Reduction of $MoO_3$ Using $Li_2CO_3$ as Lithium Source to Produce $Li_xMoO_2$ $(0<x<2)$. For Example, to Make $Li_{0.74}MoO_2$, $Li_{0.85}MoO_2$ etc.

The reaction assumes $C \rightarrow CO$ reaction (i.e. $>650°$ C.)

General Reaction $$x/2\ Li_2CO_3 + 1.0\ MoO_3 + 3x/2\ [C] \rightarrow Li_xMoO_2 + 3x/2\ CO + x/2\ CO_2$$

x/2 g-mol $Li_2CO_3$ is equivalent to (x/2 multiplied by 73.89)g 1.0 g-mol $MoO_3$ is equivalent to 143.94 g 3x/2 g-mol C is provided by 3x/2 multiplied by about 14g of hydrocarbon precursor such as coal tar.

An excess of carbon—typically 0–100% mass excess may be used.

Method
(a) Pre-mix the starting materials in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above

Example 4

Two Step Synthesis of Lithium Molybdenum (III) Oxide from Molybdenum (VI) Oxide

Step 1: Production of $MoO_2$ from molybdenum (VI) oxide.

Reaction assumes $C \rightarrow CO$ reaction (i.e. $>650°$ C.)

The reaction scheme may be written as:

$$1.0\ MoO_3 + 1.0\ C \rightarrow MoO_2 + 1.0\ CO$$

1.0 g-mol $MoO_3$ is equivalent to 143.94 g 1.0 g-mol C is equivalent to 12.00 g elemental carbon An excess of carbon—typically 0–100% mass excess may be used.

Method
(a) Pre-mix powders in molar proportions as shown
(b) Pelletize powder mixture
(c) Heat the pellet at a rate of 1–5° C./minute to 650–950° C. in a hydrogen atmosphere
(d) Dwell at desired temperature for 2–8 hours
(e) Cool to room temperature at a rate of 1–5° C./minute
(f) Remove from furnace when temperature of furnace <25° C.
(g) Transfer to bench top. $MoO_2$ is not air sensitive.
(h) Powderize
(i) Optionally, re-pelletize and repeat steps (c) through (h) above Step 2: Production of $LiMoO_2$ using $Li_2CO_3 + MoO_2$ produced in Step 1.

Reaction assumes $C \rightarrow CO$ reaction (i.e. $>650°$ C.)

The overall reaction scheme is:

$$0.5\ Li_2CO_3 + 1.0\ MoO_2 + 0.5\ C \rightarrow LiMoO_2 + 0.5\ CO_2 + 0.5\ CO$$

0.5 g-mol $Li_2CO_3$ is equivalent to 36.95 g 1.0 g-mol $MoO_2$ is equivalent to 127.94 g 0.5 g-mol C is equivalent to 6.00 g An excess of carbon—typically 0–100% mass excess may be used.

Method
(a) Pre-mix powders in molar proportions as shown
(b) Pelletize powder mixture
(c) Heat pellet at rate of 1–5° C./minute to 650–950° C. in inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above

Example 5

Carbothermal Reduction of $MoO_3$ to $MoO_2$ Followed by Carbothermal Reduction of $MoO_2$ Using $Li_2CO_3$ as Lithium Source to Produce $Li_xMoO_2$ Step 1: Production of $MoO_2$ $MoO_2$ is prepared by carbothermal reduction of $MoO_3$ as in Step 1 of Example 4.

Step 2: Production of $Li_xMoO_2$ using $Li_2CO_3$

For example, $Li_{0.74}MoO_2$ and $Li_{0.85}MoO_2$ were synthesized by this method.

Reaction assumes $C \rightarrow CO$ reaction (i.e. $>650°$ C.)

Reaction $$x/2\ Li_2CO_3 + 1.0\ MoO_2 + x/2\ [C] \rightarrow Li_xMoO_2 + x/2\ CO_2 + x/2\ CO$$

x/2 g-mol $Li_2CO_3$ is equivalent to (x/2 multiplied by 73.89)g 1.0 g-mol $MoO_2$ is equivalent to 127.94 g x/2 g-mol C is equivalent to (x/2 multiplied by 12.00) g of elemental carbon. Instead of or in addition to elemental carbon, other organic precursors may be used, taking into account the slightly higher equivalent weights per carbon atom of the precursors.

An excess of carbon—typically 0–100% mass excess may be used.

Method
(a) Pre-mix powders in molar proportions as shown
(b) Pelletize powder mixture
(c) Heat pellet at rate of 1–5° C./minute to 650–950° C. in a hydrogen atmosphere
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above.

Example 6

Formation of Tetralithium Molybdenum (IV) Oxide from Molybdenum (VI) Oxide

Reaction assumes C→CO reaction (i.e. >650° C.)
The reaction scheme is:

$$2.0\ Li_2CO_3 + 3.0\ MoO_3 + 3.0\ [C] \rightarrow Li_4Mo_3O_8 + 2.0\ CO_2 + 3.0\ CO$$

2.0 g-mol $Li_2CO_3$ is equivalent to 221.67 g
3.0 g-mol $MoO_3$ is equivalent to 431.82 g
3.0 g-mol C is provided by about 42 g of a hydrocarbon precursor such as polyisoprene rubber.
An excess of carbon—typically 0–100% mass excess may be used.

Method
(a) Pre-mix starting materials in molar proportions as shown
(b) Pelletize powder mixture
(c) Heat pellet at rate of 1–5° C./minute to 650–950° C. in an inert atmosphere ($N_2$, Ar or vacuum)
(d) Dwell at desired temperature for 2–8 hours
(e) Cool to room temperature at rate 1–5° C./minute
(f) Remove from furnace when temperature of furnace <25° C.
(g) Transfer to inert atmosphere (e.g. Ar glove box). These materials are generally air sensitive.
(h) Powderize
(i) Optionally, re-pelletize and repeat steps (c) through (h) above

Example 7

Lithium Iron (II) Phosphate Formed from Iron (III) Phosphate

The overall reaction scheme can be written as $$FePO_4 + 0.5\ Li_2CO_3 + 0.5[C] \rightarrow LiFePO_4 + 0.5\ CO_2 + 0.5\ CO$$

The following steps are carried out:
(a) The reactants are pre-mixed in molar proportions using a ball mill. To illustrate:

| | |
|---|---|
| 1 mol $FePO_4$ | 150.82 g |
| 0.5 mol $Li_2CO_3$ | 36.95 g |
| 1.0 mol (100% excess) elemental carbon | 12.0 g |

(b) Pelletize the powder mixture of (a).
(c) Heat the pellet to 750° C. at a rate of 2°/minute in an atmosphere containing hydrogen. Dwell for 8 hours at 750° in the hydrogen atmosphere.
(d) Cool to room temperature.
(e) Powderize pellet.

Example 8

The reaction of Example 1 is carried out, except that instead of 12 g elemental carbon, 14 g of a polybutadiene rubber is used.

Example 9

Lithium Iron (II) Phosphate Formed from Iron (III) Oxide

The general scheme is:

$$0.5\ Fe_2O_3 + 0.5\ Li_2CO_3 + (NH_4)_2HPO_4 + 0.5[C] \rightarrow LiFePO_4 + 0.5\ CO_2 + 2\ NH_3 + 3/2\ H_2O + 0.5\ CO$$

(a) Premix powders in the following proportions

| | |
|---|---|
| 0.5 mol $Fe_2O_3$ | 79.85 g |
| 0.5 mol $Li_2CO_3$ | 36.95 g |
| 1 mol $(NH_4)_2HPO_4$ | 132.06 g |
| 1. equiv. (100% excess) polystyrene ca. | 14 g |

(b) Pelletize powder mixture
(c) Heat pellet to 750° C. at a rate of 2°/minute in flowing inert atmosphere (e.g. argon). Dwell for 8 hours at 750° under argon.
(d) Cool to room temperature at 2°/minute under argon.
(e) Powderize

Example 10

Lithium Iron (II) Phosphate is Prepared According to Example 3, Except Instead of a Flowing Inert Atmosphere, Hydrogen is Used

Example 11

Lithium Iron (II) Phosphate from Iron (III) Oxide in Two Steps

Step 1. Carbothermal preparation of iron (II) phosphate.
The overall reaction scheme is:

$$3/2\ Fe_2O_3 + 2(NH_4)_2HPO_4 + 3/2[C] \rightarrow Fe_3(PO_4)_2 + 3/2\ CO + 4NH_3 + 5/2\ H_2O$$

(a) Premix reactants in the following proportions

| | |
|---|---|
| 3/2 mol $Fe_2O_3$ | 239.54 g |
| 2 mol $(NH_4)_2HPO_4$ | 264.12 g |
| 3 mol carbon (100% excess) | 36 g |

(b) Pelletize powder mixture
(c) Heat pellet to 800° C. at a rate of 2°/minute in an atmosphere of hydrogen. Dwell for 8 hours at 750° in the hydrogen atmosphere.
(d) Cool to room temperature.
(e) Powderize pellet.

Step 2. Preparation of Lithium Iron (II) Phosphate from the Iron (II) Phosphate of Step 1.
The overall reaction scheme is:

$$Li_3PO_4 + Fe_3(PO_4)_2 \rightarrow 3LiFePO_4$$

(a) Premix reactants in the following proportions

| | |
|---|---|
| 1 mol $Li_3PO_4$ | 115.79 g |
| 1 mol $Fe_3(PO_4)_2$ | 357.48 g |

(b) Pelletize powder mixture
(c) Heat pellet to 750° at a rate of 2°/minute in flowing inert atmosphere (e.g., argon). Dwell for 8 hours at 750° C. under argon.
(d) Cool to room temperature at 2° C./minute under argon.
(e) Powderize pellet.

Example 12

Lithium Iron (II) Magnesium Phosphate Formed from Iron (III) Phosphate

The overall reaction scheme can be written as:

$$0.5\ Li_2CO_3 + 0.9\ FePO_4 + 0.1\ Mg(OH)_2 + 0.1(NH_4)_2HPO_4 + 0.45[C] \rightarrow LiFe_{0.9}Mg_{0.1}PO_4 + 0.5CO_2 + 0.45CO + 0.2NH_3 + 0.25\ H_2O$$

(a) Pre-mix reactants in the following proportions

| | | |
|---|---|---|
| 0.50 mol $Li_2CO_3$ | = | 36.95 g |
| 0.90 mol $FePO_4$ | = | 135.74 g |
| 0.10 mol $Mg(OH)_2$ | = | 5.83 g |
| 0.10 mol $(NH_4)_2HPO_4$ | = | 1.32 g |
| 0.90 mol carbon (100% excess) | = | 10.8 g |

(b) Pelletize powder mixture
(c) Heat to 750° C. at a rate of 2°/minute in hydrogen atmosphere. Hold for 8 hours dwell at 750° C.
(d) Cool at a rate of 2°/minute
(e) Powderize pellet.

Example 13

Lithium Iron (II) Magnesium Phosphate from Iron (III) Oxide

The reaction scheme may be written as:

$$0.50\ Li_2CO_3 + 0.45\ Fe_2O_3 + 0.10\ Mg(OH)_2 + (NH_4)_2HPO_4 + 0.45[C] \rightarrow LiFe_{0.9}Mg_{0.1}PO_4 + 0.5\ CO_2 + 0.45\ CO + 2NH_3 + 1.6H_2O$$

(a) Pre-mix reactants in following ratio

| | | |
|---|---|---|
| 0.50 mol $Li_2CO_3$ | = | 36.95 g |
| 0.45 mol $Fe_2O_3$ | = | 71.86 g |
| 0.10 mol $Mg(OH)_2$ | = | 5.83 g |
| 1.00 mol $(NH_4)_2HPO_4$ | = | 132.06 g |
| 0.90 mol carbon (100% excess) | = | 10.8 g |

(b) Pelletize powder mixture
(c) Heat to 750° C. at a rate of 2°/minute in hydrogen. Hold for 8 hours dwell at 750° C. in hydrogen.
(d) Cool at a rate of 2°/minute
(e) Powderize pellet.

Example 14

Lithium Iron (II) Calcium Phosphate from Iron (III) Oxide

The overall reaction scheme is:

$$0.50\ Li_2CO_3 + 0.45\ Fe_2O_3 + 0.1\ Ca(OH)_2 + (NH_4)_2HPO_4 + 0.45[C] \rightarrow LiFe_{0.9}Ca_{0.1}PO_4 + 0.5\ CO_2 + 0.45\ CO + 2\ NH_3 + 1.6H_2O$$

(a) Pre-mix reactants in the following proportions

| | | |
|---|---|---|
| 0.50 mol $Li_2CO_3$ | = | 36.95 g |
| 0.45 mol $Fe_2O_3$ | = | 71.86 g |
| 0.10 mol $Ca(OH)_2$ | = | 132.06 g |
| 0.9 equivalents polyethylene 12.6 g (100% molar excess) | | |

(b) Pelletize powder mixture
(c) heat to 750° C. at a rate of 2°/minute in argon. Hold for 8 hours dwell at 750° C. in argon.
(d) Cool at a rate of 2°/minute
(e) Powderize pellet.

Example 15

Formation of Gamma—$LiV_2O_5$ $$V_2O_5 + 0.5\ Li_2CO_3 + 0.25\ C \rightarrow LiV_2O_5 + \tfrac{3}{4}\ CO_2$$

(a) Pre-mix $V_2O_5$, $Li_2CO_3$ and Shawinigan Black (carbon) using ball mixer with suitable media. Use a 25% weight excess of carbon over the reaction amounts above. For example, according to reaction above:

| Need: | 1 mol $V_2O_5$ | 181.88 g |
|---|---|---|
| | 0.5 mol $Li_2CO_3$ | 36.95 g |
| | 0.25 mol carbon | 3.00 g |
| (but use 25% excess carbon 3.75 g) | | |

(b) Pelletize powder mixture
(c) Heat pellet to 600° C. in a hydrogen atmosphere at a heat rate of approximately 2°/minute. Hold at 600° C. for about 60 minutes.
(d) Allow to cool to room temperature in argon at cooling rate of about 2°/minute.
(e) Powderize pellet using mortar and pestle

Example 16

Formation of Trilithium Vanadium (III) Phosphate from Vanadium (V) Oxide

The overall reaction scheme is:

$$V_2O_5 + 3/2\ Li_2CO_3 + 3(NH_4)_2HPO_4 + [C] \rightarrow Li_3V_2(PO_3) + 2\ CO + 3/2\ CO_2 + 6\ NH_3 + 9/2\ H_2O$$

(a) Pre-mix reactants above using ball mill with suitable media. Thus,

| | |
|---|---|
| 1 mol $V_2O_5$ | 181.88 g |
| 3/2 mol $Li_2CO_3$ | 110.84 g |
| 3 mol $(NH_4)_2HPO_4$ | 396.18 g |
| 2 equivalents (100% excess) polybutadiene | 28 g |

(b) Pelletize powder mixture
(c) Heat pellet at 2°/minute to 300° C. to remove $CO_2$ (from $Li_2CO_3$) and to remove $NH_3$, $H_2O$. Heat in an inert atmosphere (e.g. argon). Cool to room temperature.
(d) Powderize and repelletize
(e) Heat pellet in inert atmosphere at a rate of 2° C./minute to 850° C. Dwell for 8 hours at 850° C.
(f) Cool to room temperature at a rate of 2°/minute in argon.
(g) Powderize

Example 17

In situ Reduction of Iron III Oxide with Sucrose as Source of Reducing Carbon The reaction scheme is (assuming $C \rightarrow CO_2$ reaction)

$$C_{12}H_{22}O_{11} + Fe_2O_3 + 2LiH_2PO_4 \rightarrow 2LiFePO_4 + 10.5C + 11\ H_2O + 1.5\ CO_2$$

The starting materials are mixed in the molar proportions through dry powder mixing (such as ball milling) or wet mixing (such as spray drying). The starting material mixture is heated above 450° C. for four hours. The excess carbon from decomposition is finely distributed in the reaction product.

Example 18

Lithium Iron (II) Magnesium Phosphate Formed from Iron (II) Oxide. The Overall Reaction Scheme may be Written as $$0.5\ Li_2CO_3 + 0.9\ FeO + 0.1\ Mg(OH)_2 + (NH_4)_2HPO_4 \rightarrow LiFe_{0.9}Mg_{0.1}PO_4 + 0.5\ CO_2 + 2\ NH_3 + 1.6\ H_2O$$

Pre-mix Reactants

| | | |
|---|---|---|
| 0.5 mol $Li_2CO_3$ | = | 37 g |
| 0.9 mol FeO | = | 64.6 g |
| 0.1 mol $Mg(OH)_2$ | = | 5.83 g |
| 1.0 mol $(NH_4)_2HPO_4$ | = | 13.2 g |
| carbon black | = | 20 g |

Pelletize the reactants, and heat the pellet to 750° C. Hold for 8 hours at 750° C. cool at a rate of 2° C./minute, and powderize the pellet. The reaction product contains fine grained $LiFe_{0.9}Mg_{0.1}PO_4$ with carbon intimately dispersed throughout.

The description of the invention is merely exemplary in nature and, thus, variations that do not depart from the gist of the invention are intended to be within the scope of the invention. Such variations are not to be regarded as a departure from the spirit and scope of the invention.

We claim:

1. A solid state method for synthesizing an inorganic metal compound, comprising the steps of:
    combining starting materials comprising at least one particulate metal compound and at least one organic material to fin a mixture; and
    heating the mixture at a temperature and for a time sufficient to form a reaction product, wherein at least one metal of the starting material is reduced in oxidation state during heating to form the inorganic metal compound.

2. A method according to claim 1, wherein the organic material forms a carbonaceous material having from about 50 percent to 100 atom percent carbon under the reaction conditions.

3. A method according to claim 1, wherein on heating the organic material decomposes to form a decomposition product containing carbon in a form capable of acting as a reductant.

4. A method according to claim 1, wherein the organic material is present in stoichiometric excess.

5. A method according to claim 1, wherein the organic material comprises an organic polymer.

6. A method according to claim 1, wherein the organic material comprises a hydrocarbon.

7. A method according to claim 1, wherein the organic material comprises a carbohydrate.

8. A method according to claim 7, wherein the organic material comprises sucrose.

9. A method according to claim 1, wherein the starting material further comprises at least one particulate alkali metal compound.

10. A method according to claim 9, wherein the alkali metal compound comprises a lithium compound.

11. A method according to claim 1, wherein the reaction product comprises a lithiated metal phosphate.

12. A method according to claim 1, wherein the reaction product comprises a lithiated metal oxide.

13. A method according to claim 1, further comprising the step of reacting the reaction product with an alkali metal compound.

14. A method according to claim 13, wherein the alkali metal compound comprises a lithium compound.

* * * * *

UNITED STATES PATENT AND TRADEMARK OFFICE
CERTIFICATE OF CORRECTION

| | | |
|---|---|---|
| PATENT NO. | : 6,730,281 B2 | Page 1 of 1 |
| APPLICATION NO. | : 10/150353 | |
| DATED | : May 4, 2004 | |
| INVENTOR(S) | : Jeremy Barker et al. | |

It is certified that error appears in the above-identified patent and that said Letters Patent is hereby corrected as shown below:

Column 32 Line 33 - Example 16
Delete: "$Li_3V_2(PO_3+ 2\ CO$"
Insert: -- $Li_3V_2(PO4)_3 + 2\ CO$ --

Column 33 Line 37 - Claim 1
Delete: "fin"
Insert: -- form --

Signed and Sealed this
Tenth Day of May, 2011

David J. Kappos
*Director of the United States Patent and Trademark Office*